United States Patent
Matsumoto et al.

(10) Patent No.: US 8,553,564 B2
(45) Date of Patent: Oct. 8, 2013

(54) MANAGEMENT SYSTEM AND COMPUTER SYSTEM MANAGEMENT METHOD

(75) Inventors: Masayoshi Matsumoto, Yokohama (JP); Takaki Kuroda, Machida (JP); Satoshi Fukuda, Yokohama (JP); Nobuo Beniyama, Yokohama (JP); Mitsunori Satomi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 12/937,961

(22) PCT Filed: Jun. 28, 2010

(86) PCT No.: PCT/JP2010/060999
§ 371 (c)(1),
(2), (4) Date: Jun. 2, 2011

(87) PCT Pub. No.: WO2012/001762
PCT Pub. Date: Jan. 5, 2012

(65) Prior Publication Data
US 2011/0320599 A1    Dec. 29, 2011

(51) Int. Cl.
*G06F 15/173*    (2006.01)
(52) U.S. Cl.
USPC .......................................... 370/241; 709/224
(58) Field of Classification Search
USPC ....................................................... 709/225
See application file for complete search history.

(56) References Cited

U.S. PATENT DOCUMENTS

| | | | |
|---|---|---|---|
| 6,138,122 A | 10/2000 | Smith et al. | |
| 6,405,310 B1 | 6/2002 | Simpson | |
| 6,917,288 B2 | 7/2005 | Kimmel et al. | |
| 7,254,645 B2 | 8/2007 | Nishi | |
| 7,346,678 B1 | 3/2008 | Zhu et al. | |
| 7,506,048 B1* | 3/2009 | Motoyama | 709/224 |
| 2003/0033410 A1* | 2/2003 | Kobayashi | 709/225 |
| 2003/0149796 A1 | 8/2003 | Emerson et al. | |
| 2005/0204032 A1 | 9/2005 | Mirza-Baig | |
| 2005/0216578 A1 | 9/2005 | Thompson | |
| 2005/0267928 A1 | 12/2005 | Anderson et al. | |
| 2006/0041928 A1 | 2/2006 | Masuoka | |

(Continued)

FOREIGN PATENT DOCUMENTS

| | | |
|---|---|---|
| EP | 1 631 003 | 3/2006 |
| JP | 11-327946 A | 11/1999 |

(Continued)

OTHER PUBLICATIONS

U.S. Appl. No. 12/672,991, filed Feb. 10, 2010, Yoshimura.

(Continued)

*Primary Examiner* — Kevin C Harper
(74) *Attorney, Agent, or Firm* — Foley & Lardner LLP

(57) ABSTRACT

A management apparatus for managing a computer system stores configuration information of multiple management-target apparatuses based on multiple first information received from multiple management-target apparatuses. The management apparatus, based on the configuration information and multiple additional component application condition information, determines whether or not to use multiple additional component information to acquire multiple second information from the multiple management-target apparatuses. The management apparatus, in a case where a determination to carry out acquisition is made, uses the multiple additional component information to receive the multiple second information from the multiple management-target apparatuses, and based on the multiple second information, either creates or updates the management information of the multiple management-target apparatuses.

20 Claims, 33 Drawing Sheets

(56) References Cited

U.S. PATENT DOCUMENTS

| | | | |
|---|---|---|---|
| 2006/0080429 A1 | 4/2006 | Motoyama et al. | |
| 2006/0165103 A1 | 7/2006 | Trudeau et al. | |
| 2006/0224705 A1 | 10/2006 | Takase | |
| 2007/0067430 A1 | 3/2007 | Hirata et al. | |
| 2009/0013065 A1* | 1/2009 | Nagashima | 709/223 |
| 2010/0309501 A1 | 12/2010 | Hagiuda | |
| 2011/0107079 A1* | 5/2011 | Minami et al. | 713/150 |
| 2012/0179804 A1* | 7/2012 | Katanp et al. | 709/223 |

FOREIGN PATENT DOCUMENTS

| | | |
|---|---|---|
| JP | 2000-172600 | 6/2000 |
| JP | 2001-060180 | 3/2001 |
| JP | 2005-044355 | 2/2005 |
| JP | 2005-174244 | 6/2005 |
| JP | 2005-175736 | 6/2005 |
| JP | 2006-058938 A | 3/2006 |
| JP | 2006-085689 | 3/2006 |
| JP | 2007-041803 | 2/2007 |
| JP | 2009-053862 A | 3/2009 |
| JP | 2009-217497 A | 9/2009 |
| JP | 2010-072873 | 4/2010 |

OTHER PUBLICATIONS

PCT International Search Report and Written Opinion on application No. PCT/JP2010/060999 dated Aug. 10, 2010 (7 pages).

U.S. Appl. No. 12/866,880, filed Aug. 9, 2010, Sugata et al.

USPTO Non-final Office Action on U.S. Appl. No. 12/672,991 mailed Dec. 5, 2011; 35 pages.

PCT International Search Report and Written Opinion on Application No. PCT/JP2009/002903 dated Sep. 15, 2009; 6 pages (with partial English-language translation).

Non-Final Office Action U.S. Appl. No. 12/866,880 dated Mar. 15, 2012.

PCT International Search Report and Written Opinion on application No. PCT/JP2010/060064 dated Sep. 7, 2010; 5 pages (with partial translation—1 page).

Harrington, D. et al.; An Architecture for Describing Simple Network Management Protocol (SNMP) Management Frameworks; Network Working Group RFC 3411; Dec. 2002; pp. 1-64.

Pandey, S., et al.; IP Network Topology Discovery Using SNMP; Jan. 2009, IEEE, IEEEXPLORE.IEEE.ORG/XPLS/ABS_ALL.JSP?ARNUMBER=4897254&TAG=1; 5 pages.

Schoenwaelder, J.; Simple Network Management Protocol (SNMP) Context EngineID Discovery; Network Working Group, RFC 5343; Sep. 2008; pp. 1-9.

Siamwalla, R., et al.; Discovering Internet Topology; May 1999; Cornell University, Ithaca, NY, Technical Report; www.cs.cornell.edu/skeshav/papers/discovery.pdf; pp. 1-16.

USPTO Notice of Allowance on U.S. Appl. No. 12/672,991 dated May 21, 2012; 15 pages.

PCT International Search Report on Application No. PCT/JP2010/060999 dated Aug. 10, 2010; 7 pages.

USPTO final Office Action on U.S. Appl. No. 12/866,880 mailed Nov. 13, 2012; 24 pages.

Fujimoto, Koji; Windows Server 2008, Nikkei Computer 20071126, No. 692; Nov. 2007; pp. 159-164, with partial English translation.

Japan Patent Office action on application 2012-522368 mailed Aug. 6, 2013; pp. 1-5, with partial English translation.

* cited by examiner

FIG. 8

```
                                                 ┌─1034
//EX: PLUG-IN FOR ACQUIRING NUMBER OF DB TRANSACTIONS

<AdditionalInformation>
 <Protocol>SNMP</Protocol>
 <DataInput>
  <Variable>transactionNum</Variable>
  <command>getObject("1011157542123")</command>
 </DataInput>
  <DataSave>
   <Key> 2001 </Key>
   <Value> transactionNum </Value>
   <Description> DB Transaction Num </Description>
  </DataSave>
</AdditionalInformation>
```

FIG. 14

| APPARATUS-SIDE BASIC INFORMATION 2022 | | |
|---|---|---|
| HOSTNAME 20221 | VENDOR NAME 20222 | MODEL NAME 20223 |
| Server_A | AAA | AAA5000 |

FIG. 15

| APPARATUS-SIDE DETAILED INFORMATION | | | |
|---|---|---|
| CPU Spec | CPU core | Memory Size |
| Server_A | AAA | AAA5000 |

PLUG-IN APPLICATION RESULT DISPLAY SCREEN — G10

| G101 | G102 | G103 | G104 | G105 | G106 | G107 |
|---|---|---|---|---|---|---|
| Status | Node | Plug-in | Protocol | Credential | Date | Description |
| OK | Asagao | Plug-A | WMI | wmi2 | 2010/05/24 18:10:36 | Succeeded |
| Error | Hirugao | Plug-B | — | — | 2010/05/24 18:17:21 | INELIGIBLE NODE |
| Error | Yorugao | Plug-C | SSH | — | 2010/05/24 18:10:36 | NO CORRESPONDING AUTHENTICATION INFORMATION |
| Error | Kiku | Plug-D | SMI-S | smis1 | 2010/05/24 18:10:36 | INSTANCE CHECK RESULT : INELIGIBLE NODE |

FIG. 26

CREDENTIAL MANAGEMENT TABLE 1032A

| | 103221 | 103222 | 103223 | 103224 | 10322A etc., | 10322A Node ID 0001 | 10322B Node ID 0002 | 10322B Node ID 0002 | |
|---|---|---|---|---|---|---|---|---|---|
| | ID | name | User ID | PW | | | | | ... |
| | A1001 | wmi1 | Admin1 | Admin | | invalid | | | ... |
| | A1002 | wmi2 | System | xyz | | | invalid | | ... |
| | ... | ... | ... | ... | ... | ... | ... | ... | ... |
| | A2001 | ssh1 | Admin1 | Admin 22 | | | | | ... |
| | A2002 | ssh2 | System | xyz 30 | | | | | ... |
| | ... | ... | ... | ... | ... | | | | ... |
| | A3001 | snmp1 | 161 | public | | | | | ... |
| | A3002 | snmp2 | 162 | public | | | | | ... |
| | ... | ... | ... | ... | | | | | ... |
| | A4001 | smis1 | 5989 | root/aaa | | | | invalid | ... |
| | A4002 | smis2 | 5990 | root/bbb | | | | | ... |
| | ... | ... | ... | ... | | | | | ... |

FIG. 30

AUTHENTICATION ERROR RESOLUTION SCREEN — G50

| PROTOCOL G501 | ERROR NODE G502 | UNUSED CREDENTIAL G503 | CREDENTIAL ADDITION G504 |
|---|---|---|---|
| WMI | NODES A, B, C | wmi3 (B51), wmi5 (B51) | new (B52) |
| SSH | NODES E, J | — | new (B52) |
| SMI-S | — | — | — |
| SNMP | NODES A, K | snmp2 (B51) | new (B52) |

MANAGEMENT SYSTEM AND COMPUTER SYSTEM MANAGEMENT METHOD

CROSS-REFERENCE TO RELATED APPLICATIONS

U.S. Ser. No. 12/672,991 filed Feb. 10, 2010 and U.S. Ser. No. 12/866,880 filed Aug. 9, 2010, are cross references.

TECHNICAL FIELD

The present invention relates to a management system and a computer system management method.

BACKGROUND ART

A computer system, for example, is comprised by coupling a host computer, a storage apparatus, and a switching apparatus and various other types of node apparatuses to a communication network. Managing the respective node apparatuses comprising the computer system is an important task from the standpoint of computer system operation.

In order to manage a node apparatus, information must be acquired from this node apparatus. The technology disclosed in Patent Literature 1, for example, is known as technology for acquiring information from a node apparatus. According to Patent Literature 1, an installed business apparatus comprising an IP address in a specified range of IP addresses is discovered, and information is acquired from this discovered installed business apparatus.

CITATION LIST

Patent Literature

[PTL 1]
Japanese Patent Application Laid-Open No. 2005-175736

SUMMARY OF INVENTION

Technical Problem

However, there are cases where it is difficult to properly manage the respective node apparatuses comprising the computer system. One reason for this is that there may be cases where the method for acquiring information from the newly discovered node apparatus is new and/or where the information items needed for management are new, making it impossible to properly acquire information in these cases.

In addition, the larger the number of node apparatus comprising the computer system, the more preparation time and trouble it takes to appropriately manage the respective node apparatuses, thereby increasing management costs.

Accordingly, an object of the present invention is to provide a management system and a computer system management method that make it possible to more easily manage a management-targeted apparatus. Other objects of the present invention should become clear from the description of the embodiment explained hereinbelow.

Solution to Problem

In one embodiment of the present invention, there is disclosed a management system: including a communication interface for coupling to multiple management-target apparatuses; a memory for storing a management program; multiple additional component information and multiple additional component application condition information; and a microprocessor, wherein each of the multiple additional component information comprises either all or a portion of either setting information or a processing procedure for acquiring management information from the multiple management-target apparatuses, the multiple additional component application condition information comprise a corresponding additional component information identifier and a condition for receiving information from the multiple management-target apparatuses based on the corresponding additional component information, and by executing the management program, the microprocessor: (a) receives multiple first information from the multiple management-target apparatuses through the communication interface, and stores configuration information of the multiple management-target apparatuses in the memory based on the multiple first information; (b) determines, based on the configuration information and the multiple additional component application condition information, whether or not to use the multiple additional component information to acquire multiple second information from the multiple management-target apparatuses; (c) uses the multiple additional component information to receive the multiple second information from the multiple management-target apparatuses via the communication interface in a case where the determination in the (b) is to acquire [the multiple second information]; and (d) either creates or updates management information of the multiple management-target apparatuses in the memory based on the multiple second information.

The present invention may also be understood as a computer system management method. In addition, at least one part of the configuration of the present invention may be configured as a computer program. The computer program may either be affixed to and distributed on a recording medium or delivered via a communication medium. Furthermore, the configuration may be such that either all or a part of the computer program is realized as a dedicated hardware circuit. In addition, the computer program according to this example may be distributed by a distribution computer. In accordance with this, the distribution computer comprises (1) either an installation program or a computer program for installing the distribution-target computer program, (2) a CPU for processing an acquisition request of either the installation program or the computer program, and (3) a communication interface for sending either the installation program or the computer program.

BRIEF DESCRIPTION OF DRAWINGS

FIG. 8 shows an example of a plug-in definition.

FIG. 14 shows basic information held in a node apparatus.

FIG. 15 shows detailed information held in a node apparatus.

FIG. 23 is a display screen of the plug-in application result.

FIG. 26 shows a credential management table.

FIG. 30 shows a screen for supporting a resolution of an authentication error.

DESCRIPTION OF EMBODIMENTS

Figure 1:
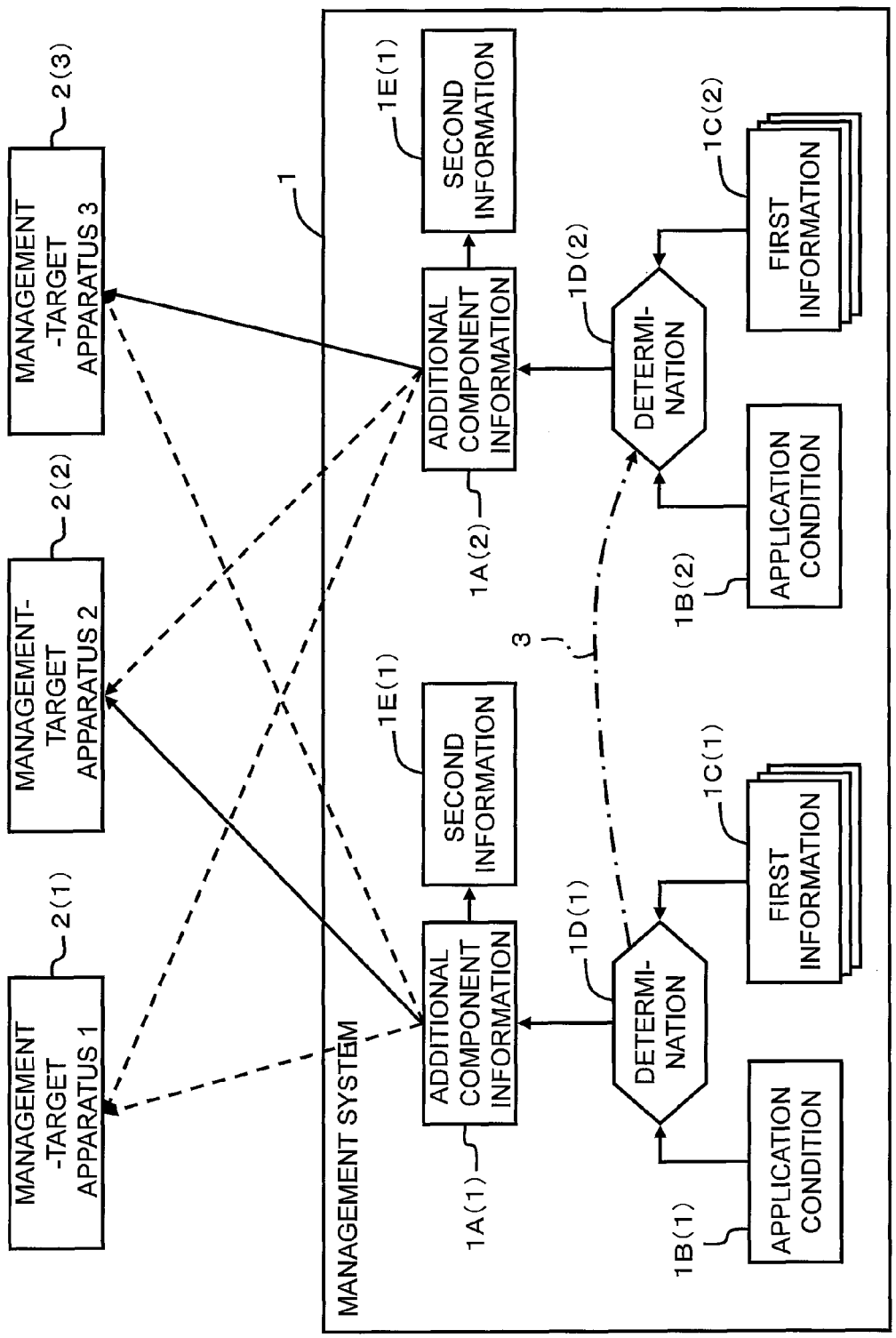
FIG. 1 is an illustration schematically showing an overview of an embodiment.

An embodiment of the present invention will be explained below by referring to the drawings. In the following explanation, additional information is monitoring-targeted apparatus information that is capable of being acquired anew in accordance with an additional component program added to the management computer (either a management system or a system management apparatus). The additional component program is added to the management computer in accordance with a command or other such instruction.

In the examples, basic information and detailed information are either information that the management computer is able to acquire by default from a management-targeted apparatus (the node apparatus) or information that the management computer is able to acquire by default without using the additional component program. Furthermore, information that the management computer "is able to acquire by default from the management-targeted apparatus" refers to anyone or more of the following.

(A) Information for which the acquisition process is included beforehand in the management program executed by the management computer.

(B) Information that is acquirable prior to the management program being installed in the management computer and an additional component being added to the management program in accordance with a user instruction.

(C) Information that is acquirable in accordance with a management interface (for example, the Windows Management Interface (WMI)), which Windows (registered trademark), UNIX (registered trademark) or another such general-purpose OS provides at the time the management program is provided.

(D) Information that is acquirable in accordance with a monitoring protocol (for example, the Simple Network Management Protocol (SNMP)), which an IP-Switch or other such network apparatus provides at the time the management program is provided.

(E) Information that is acquirable in accordance with a storage system management specification (for example, the Storage Management Initiative-Specification (SMI-S)), which an FC-Switch, storage system or other such apparatus provides at the time the management program is provided.

(F) Information that is acquirable in accordance with a hardware monitoring interface (for example, the Intelligent Platform Management Interface (IPMI)), which a network apparatus, server or the like provides at the time the management program is provided.

(G) Information that is acquirable in accordance with an access interface, which a specific hardware or software vendor provides at the time the management program is provided.

In addition, in the following explanation, for example, the "information" may be explained by using expressions such as "abc table", "abc list", "abc database", and "abc queue". However, the information described in this embodiment may also comprise a structure other than a table structure, a list structure, or a database structure. In addition, for example, the expressions identifier, identification information, name, ID or the like may be used when explaining the configuration of the information, but these expressions are interchangeable.

In addition, the respective processes described hereinbelow are realized by respective programs that are stored in the memory being read and executed by a microprocessor. Therefore, the subject of each process may be either a program or the microprocessor. Or, the explanation may also give a system management apparatus or a controller as the subject of the processes.

FIG. 1 is an illustration showing an overview of one embodiment. FIG. 1 shows a simplified overview of the operations of a management system. FIG. 1 has been created to contribute to an understanding of the present invention, and does not purport to limit the scope of the present invention to the configuration shown in the drawing. Not all of the characteristic features shown in FIG. 1 are essential elements of the present invention.

A management system 1 is an apparatus for managing multiple management-target apparatuses 2(1), 2(2), 2(3) (will be called the management-targeted apparatus 2 hereinafter in cases where no particular distinction in made). The configuration of the management system 1 will be described in detail further below. The management-targeted apparatus 2, for example, is a server computer, a storage apparatus, a network apparatus or the like.

The management system 1 comprises multiple additional component information 1A(1), 1A(2), multiple additional component conditions of application 1B(1), 1B(2), multiple first information 1C(1), 1C(2), multiple determination parts 1D(1), 1D(2), and multiple second information 1E(1), 1E(2). Additional component application condition has been abbreviated to "application condition" in the drawing for the sake of convenience.

In the following explanation, unless a particular distinction is to be made, [the multiple additional component information 1A(1), 1A(2)] will be called additional component information 1A, [the multiple additional component conditions of application 1B(1), 1B(2)] will be called additional component application condition 1B, [the multiple first information 1C(1), 1C(2)] will be called first information 10, [the multiple determination parts 1D(1), 1D(2)] will be called determination part 1D, and [the multiple second information 1E(1), 1E(2)] will be called second information 1E. In addition, in FIG. 1, a case in which an example of "multiple" is given as "2" is explained, but multiple is not limited to 2, and may refer to 3 or more.

The management system 1 acquires the first information 10 from the respective management-target apparatuses 2. The first information 1C corresponds to the "information that the management computer is able to acquire by default from the management-targeted apparatus." The first information, for example, may include basic specifications, such as a node name, a vendor name, a model name, and CPU (Central Processing Unit) performance.

The management system 1 determines whether or not the respective additional component information 1A is applicable with respect to the respective management-target apparatuses 2. The determination part 1D determines beforehand whether or not the additional component information 1A corresponding to the additional component application condition 1B is applicable to the management-target apparatus 2 corresponding to the first information 1C by comparing the additional component application condition 1B to the first information 1C.

In a case where the determination made by the determination part 3 is applicable, the management system 1 acquires the second information 1E from the management-target apparatus 2 using the additional component information 1A. The second information 1E comprises at least any one or more of the configuration, status, performance, or failure of the management-target apparatus 2. The management system 1 uses the second information 1E to manage the management-target apparatus 2.

The information acquisition result achieved using the one additional component information 1A(1) is notified to the other additional component information 1A(2) as indicated by a reference sign 3. The other determination part 1D(2) uses this information acquisition result to acquire the second information 1E(2) from the management-target apparatus 2.

It may be necessary to check authentication information (For example, information comprising a user ID and/or password. This credential will be explained further below.) for acquiring the second information 1E. In a case where the authentication information configured in the management-target apparatus 2 does not match the authentication information held in the management system 1, it is not possible to fetch the second information from the management-target apparatus 2.

In this example, as will be explained hereinbelow, authentication information is not managed correspondingly for each management-target apparatus 2, but rather the authentication information is correspondingly managed for each communication protocol. The management system 1 tries the authentication information of each separate communication protocol with respect to each of the additional component information 1A. Information as to whether an authentication is right or wrong is recorded in a table.

Authentication information that could not be used in the management-target apparatus 2(1) for the additional component information 1A(1) is not able to be used in the management-target apparatus 2(1) for the additional component information 1A(2) either. Accordingly, the determination part 1D(1), which makes a determination with respect to the additional component information 1A(1), notifies the determination part 1D(2), which makes a determination with respect to the additional component information 1A(2), of the information for the management-target apparatus 2 that is unable to use the respective authentication information of different communication protocols. This information, for example, may also be called "authentication result information showing the authentication results of the authentication information of the different communication protocols and the respective management-target apparatuses 2".

The other determination part 1D(2) uses the authentication result information in the previously processed additional component information 1A(1) to execute an authentication process with respect to the additional component information 1A(2). Therefore, there is no need to test authentication information for which it is clear that testing would be useless.

In this embodiment, comparing the first information 10 and the additional component application condition 1B acquired from the management-target apparatus 2 makes it possible to determine beforehand whether or not to acquire the second information 1E from the management-target apparatus 2 using the additional component information 1A. Therefore, a management-target apparatus 2 to which the additional component information 1A does not correspond may be removed beforehand from the acquisition target of the second information. This makes it possible to shorten the time required for acquiring the second information 1E from the respective management-target apparatuses 2. As a result of this, the time required for system management can be shortened, and management efficiency can be heightened.

In this embodiment, the authentication information configured in each different communication protocol, and, in addition, the authentication result information of additional component information 1A(1) processed in advance is used when processing the next additional component information 1A(2). Therefore, it is possible to perform authentication efficiently without testing authentication information for which authentication is known to have failed. As a result of this, it is possible to acquire the second information 1E from the management-target apparatus 2 in a relatively short period of time.

The synergistic effect of a configuration that uses the first information 1C and the additional component application condition 1B to select beforehand a management-target apparatus 2 that applies the additional component, and a configuration that makes use of the authentication result information to avoid carrying out a useless authentication makes it possible to heighten system management efficiency.

In addition, in an example that will be explained hereinbelow, a configuration for supporting a user operation in a case where the second information 1E cannot be acquired using the additional component information 1A is disclosed. The user is able to use an operational support screen to restore existing authentication information and to create new authentication information. This enhances user usability.

Example 1

Figure 2:
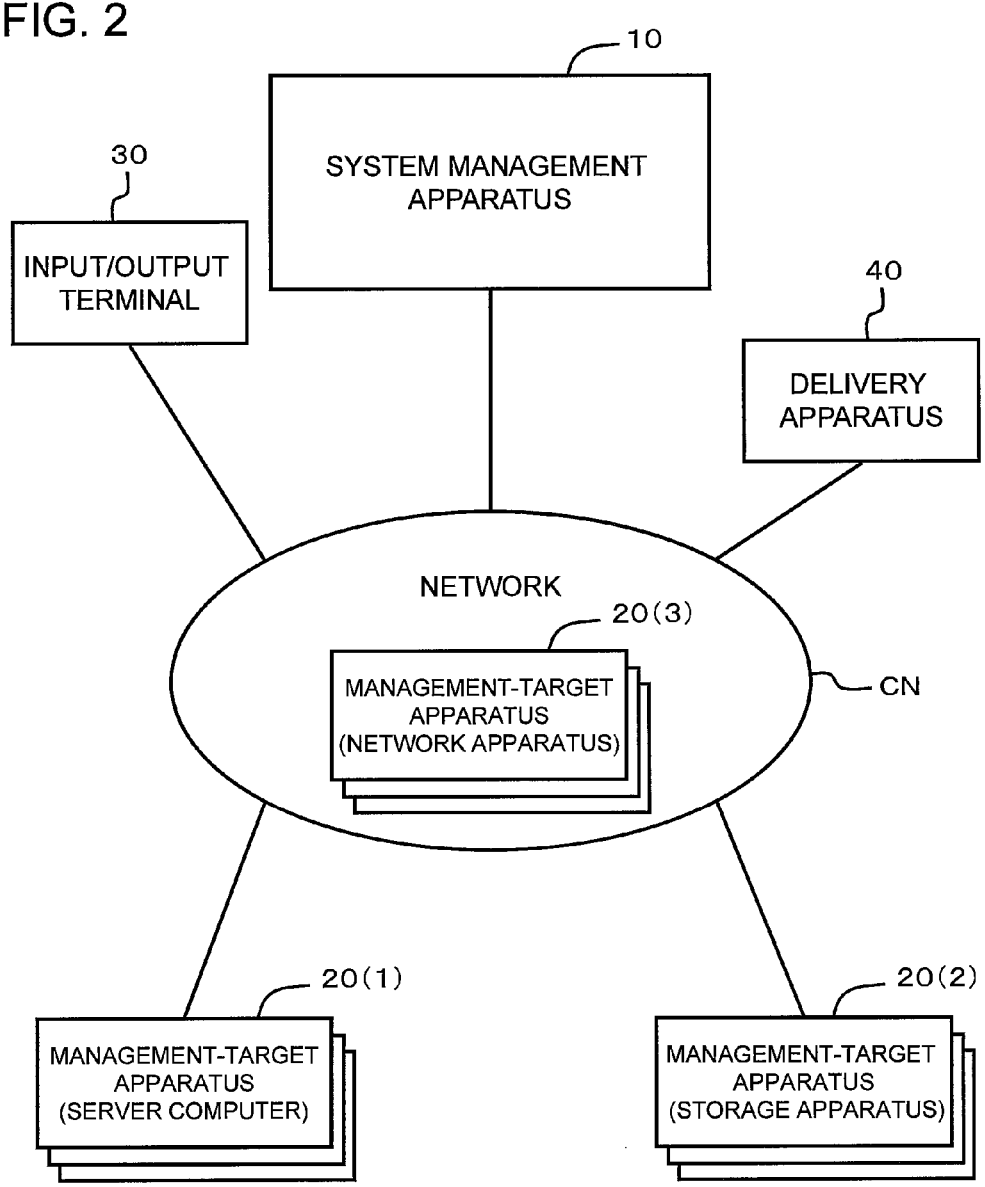
FIG. 2 is an overall block diagram of a computer system comprising a system management apparatus.

FIG. 2 shows a computer system that comprises a system management apparatus. The computer system comprises a system management apparatus 10 that serves as a "management system", multiple management-target apparatuses 20(1), 20(2), 20(3), an input/output terminal 30, a delivery apparatus 40, and a communication network CN for coupling these respective apparatuses 10, 20(1), 20(2), 20(3), 30, and 40 to one another. In cases where no particular distinction in made, the management-target apparatuses 20(1), 20(2), 20(3) will be called the management-target apparatus 20.

In describing the corresponding relationship with FIG. 1, the system management apparatus 10 corresponds to the management system 1 and the management-target apparatus 20 corresponds to the management-target apparatus 2. The basic information and detailed information (tables 1035 and 1036) described hereinbelow correspond to the first information 1C, the additional information (table 1037) described hereinbelow corresponds to the second information 1E, the plug-in application condition definition 1033 described hereinbelow corresponds to the additional component application condition 1B, and the plug-in definition 1034 described hereinbelow corresponds to the additional component information 1A.

The management-target apparatus 20 comprises multiples types of apparatuses. One management-target apparatus 20(1) is a server computer. The server computer provides a variety of services to a client computer not shown in the drawing by executing an application program. [The management-target apparatus 20(1)] may be called the server computer 20(1) hereinafter. Another management-target apparatus 20(2) is a storage apparatus. The storage apparatus stores data that is used by the server computer. [The management-target apparatus 20(2)] may be called the storage apparatus 20(2) hereinafter. Yet another management-target apparatus 20(3) is a network apparatus. The network apparatus, for example, comprises either a switching apparatus or a router apparatus. [The management-target apparatus 20(3)] may be called the network apparatus 20(3) hereinafter.

The preceding are examples, and another apparatus besides the above-mentioned apparatuses may be used as the management-target apparatus. Furthermore, in the following explanation, there may be cases in which the management-target apparatus is called the node apparatus for the sake of convenience. Furthermore, the management target is not limited to the apparatus as a whole, but rather may also be either a hardware component or a software component that comprises a part of the apparatus.

The input/output terminal 30 is a computer for inputting information into the system management apparatus 10 and fetching information from the system management apparatus 10. The input/output terminal 30 is used by the user, who is the system administrator.

The delivery apparatus 40, for example, may comprise a website that is operated by a vendor that provides a node apparatus 20. The operating entity is not limited to the vendor, but rather, for example, may be a system maintenance professional or a software vendor. Furthermore, only one delivery apparatus 40 is shown in FIG. 2, but multiple delivery apparatuses 40 corresponding to the respective vendors may exist.

The delivery apparatus 40 sends plug-in data, which constitutes the basis for a plug-in definition 1034, to the system management apparatus 10. The system management apparatus 10 creates the plug-in definition 1034 based on the plug-in data.

The delivery apparatus 40 sends the plug-in data to the system management apparatus 10 via the communication network CN either in response to a request from the system management apparatus 10 or without waiting for a request from the system management apparatus 10.

In a case where a new node apparatus has been added to the computer system, for example, the user is able to acquire the plug-in data corresponding to this new management-target apparatus by accessing the delivery apparatus 40. Or, the configuration may also be such that the plug-in data is automatically sent to the system management apparatus 10 from the delivery apparatus 40 either before or after a new node apparatus has been marketed by a vendor.

The plug-in definition 1034 (plug-in definition information 1034) corresponds to a predetermined node apparatus, and is information for acquiring configuration information and/or performance information and the like from the predetermined node apparatus. Predetermined node apparatus signifies a computer apparatus that has been newly added to the computer system and/or the hardware or software that comprises a computer apparatus. For example, using the state of a system at construction time as a benchmark, a software component that is used in the management of a node apparatus from among the software components newly installed on the system management apparatus 10 may also be called plug-in definition information. However, the present invention is not limited to this definition.

The plug-in definition 1034 will be explained in detail further below. But briefly stated, the plug-in definition 1034, for example, comprises at least one or more of the following information: a method (for example, a type of communication protocol or login information) for acquiring information from a node apparatus; an item of information (for example, a product name, a status value, a performance value or the like) to be acquired from the node apparatus, and information (for example, information that identifies an icon) for mapping information acquired from the node apparatus to a node management model.

The plug-in definition 1034, for example, may be any format, such as a file format, one row of a table, or a program format. For example, the plug-in definition 1034 may be configured to store a procedure for acquiring information from a node apparatus, or may be configured as a program for acquiring information from a node apparatus.

The system management apparatus 10 accesses a node apparatus based on the plug-in definition 1034 and acquires required information from the node apparatus. The node apparatus from which information was properly read by the system management apparatus 10 is regarded as a new management target.

Furthermore, the system management apparatus 10 may be able to acquire information from the node apparatus without using the plug-in definition 1034. For example, in the case of a node apparatus, which has been included in the computer system since this system was initially constructed, the method for accessing this node apparatus and the items to be acquired therefrom are already known to the system management apparatus 10. Therefore, the system management apparatus 10 is able to acquire information (basic information and detailed information) from the node apparatus without using the plug-in definition 1034.

In contrast to this, in the case of a new type node apparatus (or a new management item) that has been added to the computer system afterwards, the system management apparatus 10 most often does not know the method for acquiring information from this new node apparatus or the items of information that are to be acquired therefrom. Therefore, the system management apparatus 10 obtains from the delivery apparatus 40 plug-in data corresponding to the plug-in definition that corresponds to this new node apparatus.

Figure 3:
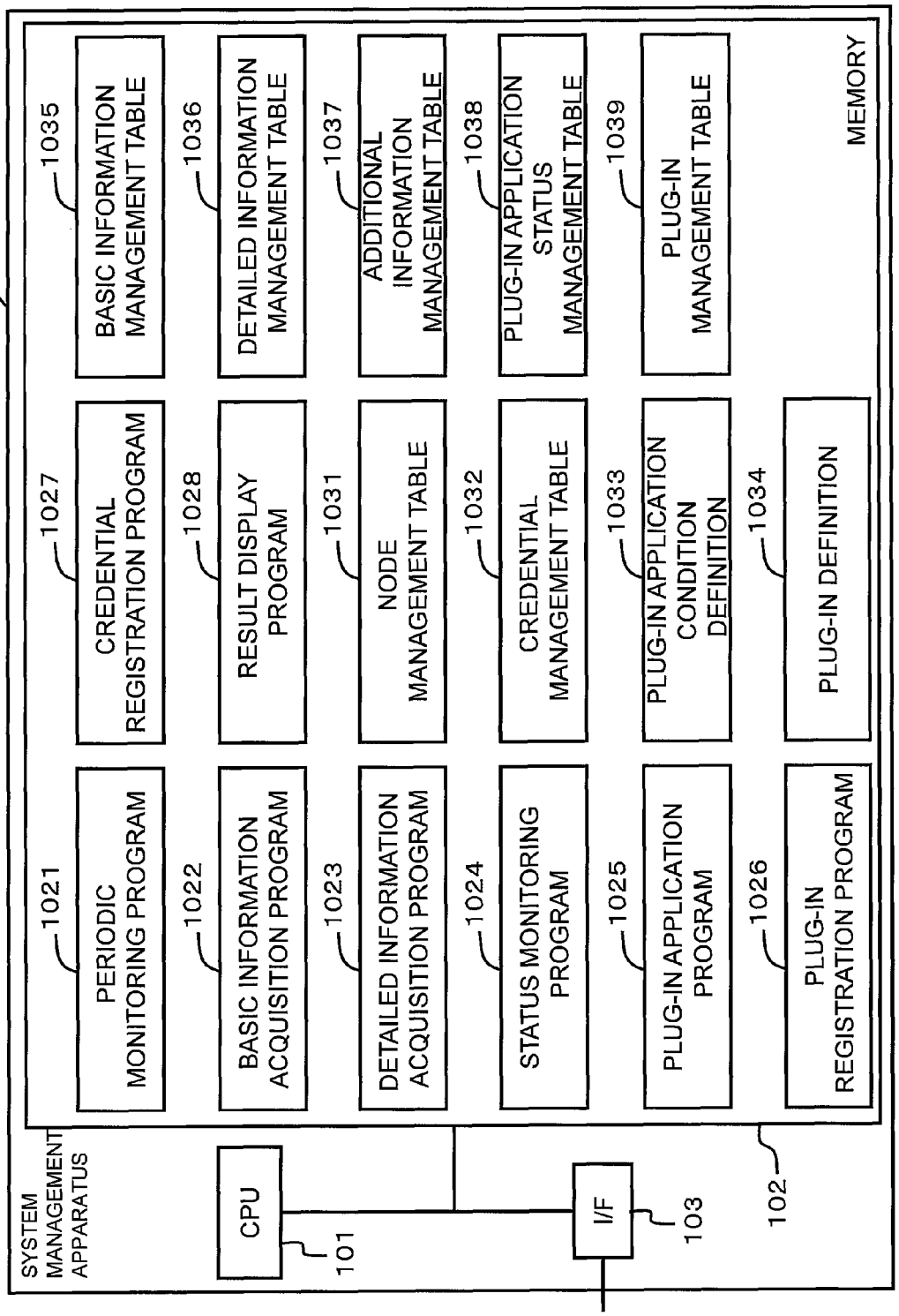
FIG. 3 is a block diagram of the system management apparatus.

FIG. 3 shows a configuration of the system management apparatus 10. The system management apparatus 10, for example, comprises a microprocessor 101, a memory 102, and a communication interface 103. For example, multiple computer programs 1021 through 1028, and multiple information 1031 through 1039 are stored in the memory 102.

The multiple computer programs, which correspond to the "management program", for example, comprise a periodic monitoring program 1021, a basic information acquisition program 1022, a detailed information acquisition program 1023, a status monitoring program 1024, a plug-in application program 1025, a plug-in registration program 1026, a credential registration program 1027, and a result display program 1028.

The multiple information, for example, comprises a node management table 1031, a credential management table 1032, a plug-in application condition definition 1033, the plug-in definition 1034, a basic information management table 1035, a detailed information management table 1036, an additional information management table 1037, a plug-in application status management table 1038, and a plug-in management table 1039. The respective information (including the tables) will be explained in detail using other drawings.

The microprocessor 101 realizes the predetermined processing shown in FIGS. 16 through 22 by reading and executing the programs 1021 through 1028 as needed. This will be explained in detail further below.

The communication management port 103 is a communication port for communicating with the respective node apparatuses 20, the input/output terminal 30, and the delivery apparatus 40 via the communication network CN.

The memory 102 comprises a storage resource like a ROM (Read

Only Memory), a RAM (Random Access Memory), and an auxiliary storage apparatus. That is, the memory 102 may comprise either one or multiple storage resources. The fact that the memory 102 is not limited to one type of semiconductor memory, but rather is a concept that includes various other types of storage apparatuses, such as an auxiliary storage apparatus, is the same in the explanation that follows as well.

Furthermore, the system management apparatus 10 need not comprise a single computer, but rather may comprise a single system management apparatus made up of multiple computers. Furthermore, the system management apparatus 10 does not have to manage each node apparatus individually, but rather is also able to group multiple node apparatuses together and manage these multiple node apparatuses as a group.

Figure 4:
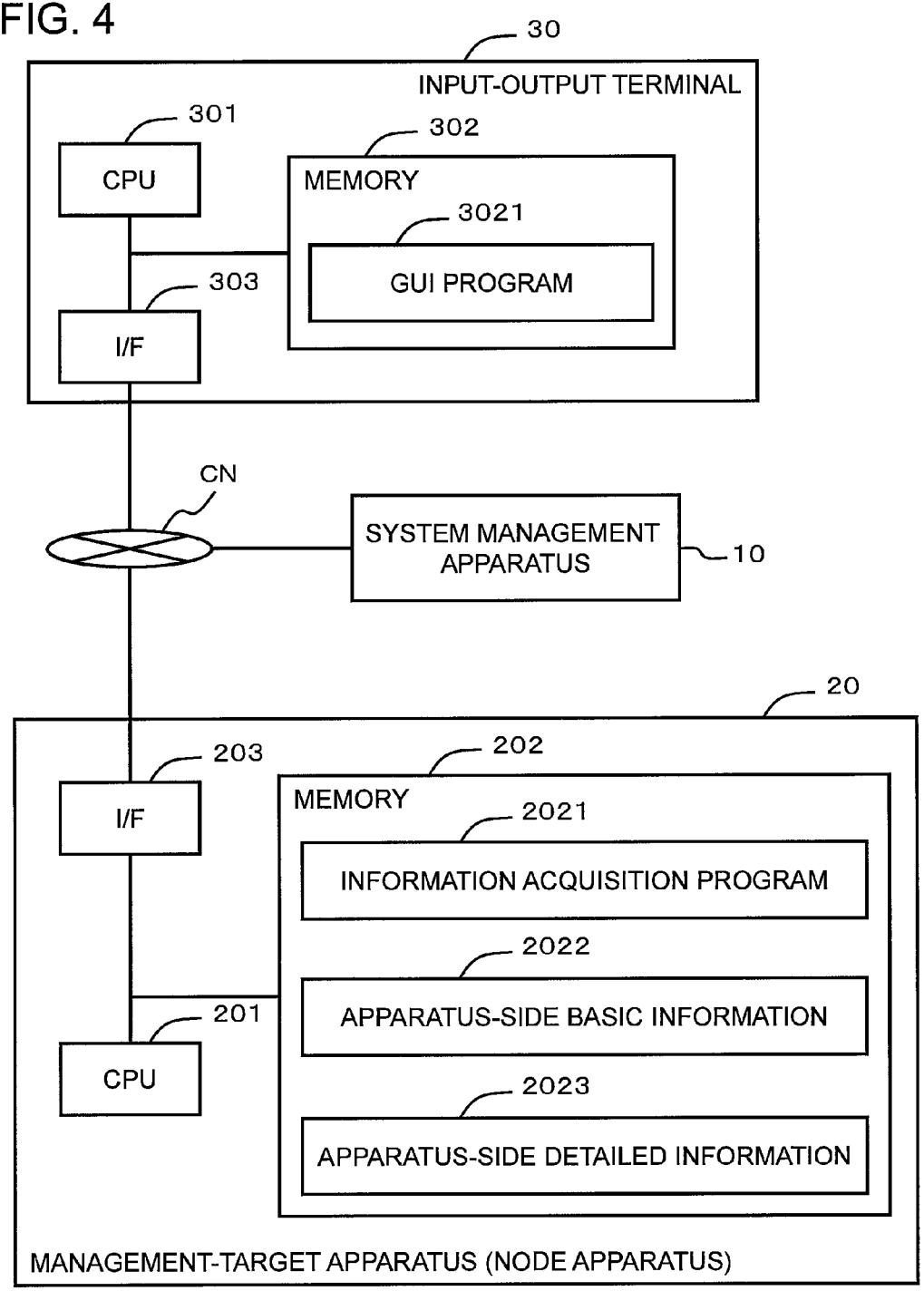
FIG. 4 is block diagrams of a node apparatus and an input/output terminal.

FIG. 4 shows an example of the configurations of the input/output terminal 30 and the node apparatus 20. The input/output terminal 30, for example, comprises a microprocessor 301, a memory 302, and a communication interface 303. A web browser or other such GUI (Graphical User Interface) program 3021 is stored in the memory 302. The microprocessor 301 inputs a user instruction via a screen provided from the system management apparatus 10 and displays a screen provided from the system management apparatus 10 on a display apparatus of the input/output terminal 30 by reading and executing the GUI program 3021.

The node apparatus 20, for example, comprise a microprocessor 201, a memory 202, and a communication interface 203. In addition to an operating system, an information acquisition program 2021, apparatus-side basic information 2022, and apparatus-side detailed information 2023 are stored in the memory 202.

The microprocessor 201 collects the basic information and the detailed information from inside itself by reading and executing the information acquisition program 2021. The microprocessor 201 stores the collected basic information in the memory 202 as the apparatus-side basic information 2022, and stores the detailed information in the memory 202 as the apparatus-side detailed information 2023. The microprocessor 201 sends the apparatus-side basic information 2022 and the apparatus-side detailed information 2023 to the system management apparatus 10 either spontaneously or in response to a request from the system management apparatus 10.

The node apparatus comprises a configuration corresponding to type thereof. In FIG. 2, a detailed configuration is omitted for the sake of expediting the explanation. Briefly stated, in the case of a storage apparatus, the node apparatus comprises multiple physical storage apparatuses, multiple logical storage apparatus (logical volumes), and a controller. The storage apparatus provides a logical volume to a server computer. Data (including a file) that is used by the server computer is stored in the logical volume. A switch, router or other such network apparatus comprise multiple communication ports, and a controller.

Figure 5:
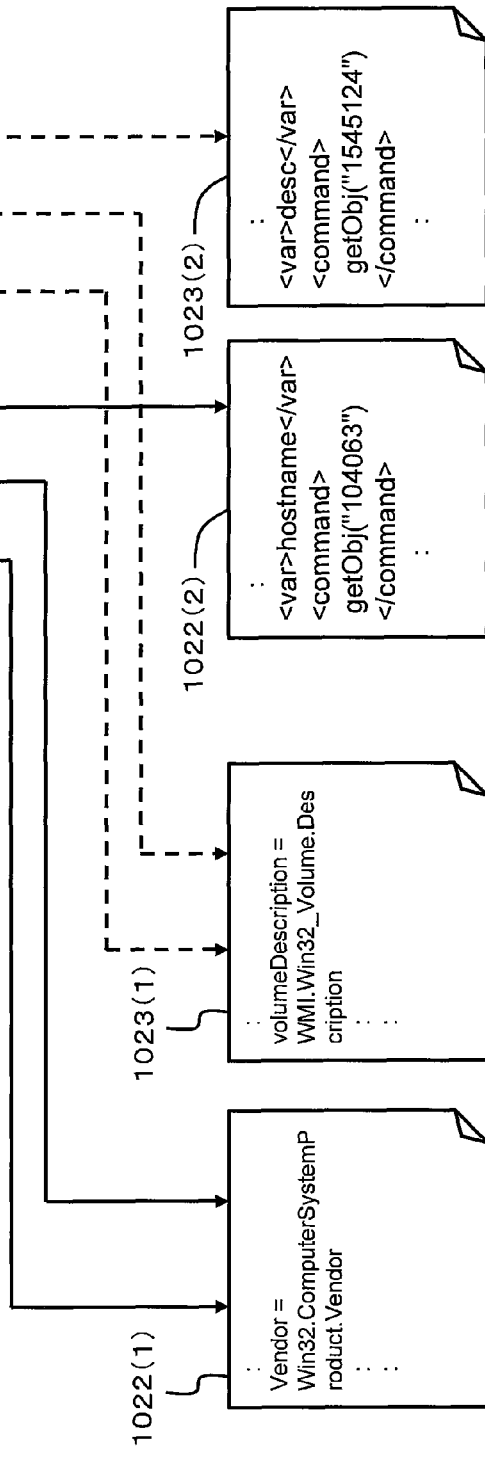
FIG. 5 shows a node management table.

FIG. 5 shows an example of the node management table 1031. The node management table 1031 is for managing a management-target node apparatus included in the computer system. The node management table 1031, for example, comprises a node ID 10311, an IP address 10312, a basic protocol 10313, a credential ID 10314, a pointer 10315 for referencing a basic information acquisition program, and a pointer 10316 for referencing a detailed information acquisition program.

The node ID 10311 is information for identifying each node apparatus 20. The IP address 10312 is information showing the location on the communication network for accessing each node apparatus. Furthermore, this information is not limited to an IP address, but rather may be any information that the system management apparatus 10 is able to access. For example, a network identifier, like an iSCSI (internet Small Computer System Interface) name may be used instead of an IP address.

The basic protocol 10313 shows a communication protocol that the system management apparatus 10 uses for acquiring the basic information and the detailed information from the node apparatus 20. The basic protocol, for example, may be WMI, SNMP, SMI-S, or IPMI.

The credential ID 10314 is information for identifying a credential that serves as the "authentication information". The system management apparatus 10, based on the credential ID, is able to detect a user ID and/or a password for acquiring the basic information and the detailed information from the node apparatus 20 using the basic protocol by referencing the credential management table 1032 shown in FIG. 6.

The pointer 10315 for referencing the basic information acquisition program is information for detecting the basic information acquisition program 1022 for acquiring the basic information from the node apparatus 20. The pointer 10316 for referencing the detailed information acquisition program is information for detecting the detailed information acquisition program 1023 for acquiring the detailed information from the node apparatus 20.

As shown in FIG. 5, the basic information acquisition program 1022 and the detailed information acquisition program 1023 are prepared in response to the type of each node apparatus. In a case where the node apparatus is a server computer, the basic information acquisition program 1022(1) and the detailed information acquisition program 1023(1) for a server computer are used. In a case where the node apparatus is a network apparatus (IP-SW), the basic information acquisition program 1022(2) and the detailed information acquisition program 1023(2) for an IP-SW are used.

The system management apparatus 10 is able to collect the basic information and the detailed information from each node apparatus 20 using the node management table 1031.

Figure 6:
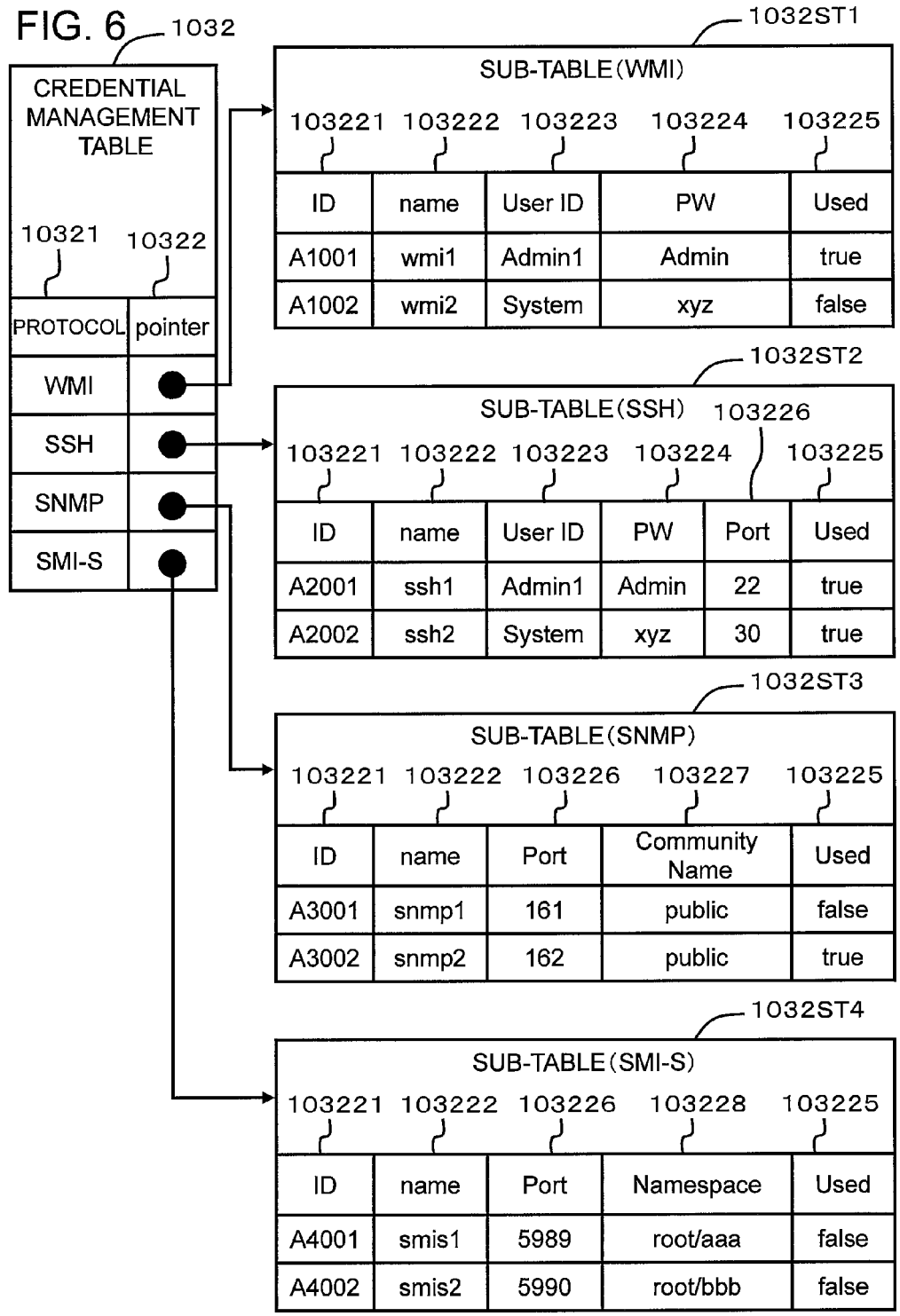
FIG. 6 shows a credential management table.

FIG. 6 shows an example of the credential management table 1032. The credential management table 1032, for example, comprises a protocol type 10321, and a pointer 10322 to a sub-table. The protocol type is abbreviated to "protocol" in FIG. 6.

A sub-table 1032ST1, 1032ST2, 1032ST3, 1032ST4 is prepared for each communication protocol. The sub-table 1032ST1 for WMI, for example, comprises an ID 103221 for identifying the credential, a credential name 103222, a user ID 103223, a password 103224, and a used flag 103225 for indicating that the protocol is being used.

The sub-table 1032ST2 for SSH comprises a communication port number 103226 in addition to 103221 through 103225 described above.

The sub-table 1032ST3 for SNMP comprises a community name 103227 in addition to the ID 103221, name 103222, used flag 103225, and communication port number 103226 described above. The sub-table 1032ST3 for SNMP uses the communication port number 103226 and the community name 103227 in place of the user ID 103223 and the password 103224.

The sub-table 1032ST4 for SMI-S comprises a namespace 103228 in addition to the ID 103221, name 103222, communication port number 103226, and used flag 103225 described above. The sub-table 1032ST4 for SMI-S uses the communication port number 103226 and the namespace 103228 in place of the user ID 103223 and the password 103224.

As described in FIG. 6, in this example, the credential is configured for each communication protocol. In this example, the credential does not correspond to each node apparatus. In this example, making the credential correspond to individual communication protocols makes it possible to easily extract a unusable credential and to carry out an authentication process efficiently.

Figure 7:
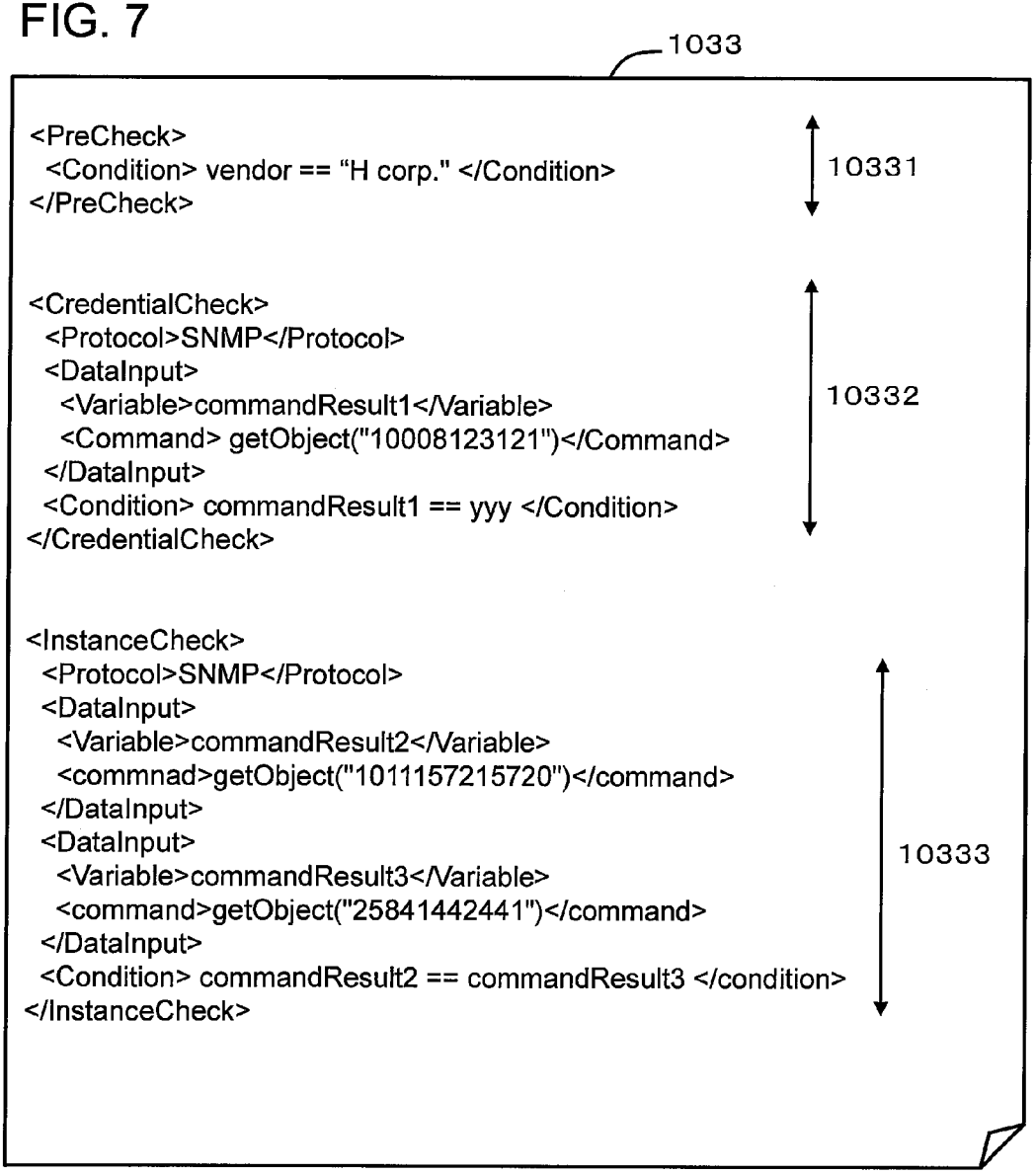
FIG. 7 shows an example of a plug-in application condition definition.

FIG. 7 shows an example of the plug-in application condition definition 1033. The plug-in application condition definition 1033 shows a predetermined condition for applying a plug-in (a function that is realized by the plug-in definition 1034 may be called a plug-in hereinafter) to a node apparatus 20.

The plug-in application condition definition 1033, for example, is created using a structured tag language like XML (eXtensible Markup Language). The plug-in definition 1034 is also able to be described using XML and other such languages.

The plug-in application condition definition 1033, for example, comprises a pre-check condition 10331, a credential check condition 10332, and an instance check condition 10333.

The pre-check condition 10331 is for determining whether or not a plug-in is capable of being applied to the node apparatus based on the basic information acquired from this node apparatus 20. For example, a vendor name is described in the pre-check condition 10331. A node apparatus provided from the same vendor as the vendor name described in the pre-check condition 10331 satisfies the pre-check condition 10331. A node apparatus provided from a different vendor than the vendor name described in the pre-check condition 10331 does not satisfy the pre-check condition 10331, and it is determined that the plug-in is unable to be applied.

The pre-check condition 10331 is not limited to the vendor name, and, for example, a node name (node type) included in the basic information and/or a model name included in the basic information can also be used. In a case where a vendor name and a model name are described in the pre-check condition 10331, only a node apparatus 20 having this vendor name and model name will satisfy the pre-check condition 10331.

The credential check condition 10332 is for determining whether or not a node apparatus 20 authentication process succeeded. A credential check is implemented in a case where the pre-check was successful. Each node apparatus 20 is repeatedly accessed for one certain plug-in using a predetermined communication protocol (the basic protocol) and the respective credentials configured in this predetermined communication protocol. The node apparatus 20 executes the authentication process based on the credential inputted from the system management apparatus 10. The credential check is carried out to discover (to confirm) the credential used in the plug-in.

When the node apparatus authentication process succeeds, it is possible to acquire predetermined information from a predetermined area of the memory 202 of the node apparatus 20. In a case where this acquisition value is the same as the value defined in the credential check condition 10332, the credential check condition is satisfied. For example, in a case where ten credentials are registered with respect to a predetermined communication protocol, the system management apparatus 10 sequentially selects the ten credentials, accesses one node apparatus 20 a total of ten times and undergoes the authentication process.

In a case where there are four types of communication protocols, ten credentials have been prepared for each communication protocol, and three node apparatuses 20 have satisfied the pre-check condition, the authentication process could be carried out a maximum of 120 times (=4×10×3) in order to determine the advisability of applying a single plug-in.

In a case where there is no pre-check condition 10331, authentication processing is carried out with respect to all the node apparatuses 20 discovered by the computer system. For example, in a case where a total of 200 node apparatuses are discovered by the computer system, authentication processing could be carried out a maximum of 8000 times (=4×10×200) to determine the advisability of applying a single plug-in.

In this example, as described above, authentication processing is undergone only with respect to the node apparatus (es) 20 that satisfy the pre-check condition 10331 from among all the node apparatuses 20 discovered by the computer system. Therefore, it is possible to reduce the total number of times the system management apparatus 10 accesses each node apparatus 20, and to shorten the time it takes to determine the advisability of applying the plug-in.

As in an example described hereinbelow, in a case where an unusable credential is detected, the ID of the node apparatus that was unable to use this credential and the ID of this credential are correspondingly stored, and can be put to good use in the process for determining the advisability of applying the next plug-in. This makes it possible to further reduce the number of authentications, and to undergo authentication more efficiently.

The instance check condition 10333 is for determining whether or not a plug-in is able to be applied based on the detailed information acquired from a node apparatus 20. The instance check is implemented in a case where the credential check has succeeded. A determination is made as to whether or not it was possible to acquire information showing basic specifications, such as the CPU specifications or version included in the detailed information and/or information showing the basic performance included in the detailed information from the node apparatus 20. The plug-in can be applied to a node apparatus 20 for which the detailed information was acquirable.

Furthermore, it is also possible to acquire the detailed information at the credential check stage. That is, it is possible to combine the credential check and the instance check into a single check. However, in a case where the configuration is such that the detailed information is acquired at the time of the credential check, it takes a longer time for the credential check process to be completed, increasing the processing load on the system management apparatus 10. Alternatively, in this example, the credential check and the instance check are separated, and the detailed information is only acquired upon having passed the credential check. Therefore, it is possible to execute the credential check process using a relatively small load, and to carry out the instance check only for a node apparatus 20 that has undergone the credential check. Therefore, it is possible to shorten processing time overall, and to reduce the processing load.

FIG. 8 shows an example of the plug-in definition 1034. In FIG. 8, an example of a plug-in for acquiring the number of transactions in a database is shown. The number of database transactions is an example of "additional information".

For example, the type of communication protocol used for acquiring the number of database transactions from the node apparatus 20, the name of the item to be acquired (number of database transactions), a value, and an item name and storage location for storing the acquired information in the additional information management table 1037 are described in the plug-in definition 1034 shown in FIG. 8.

Figure 9:
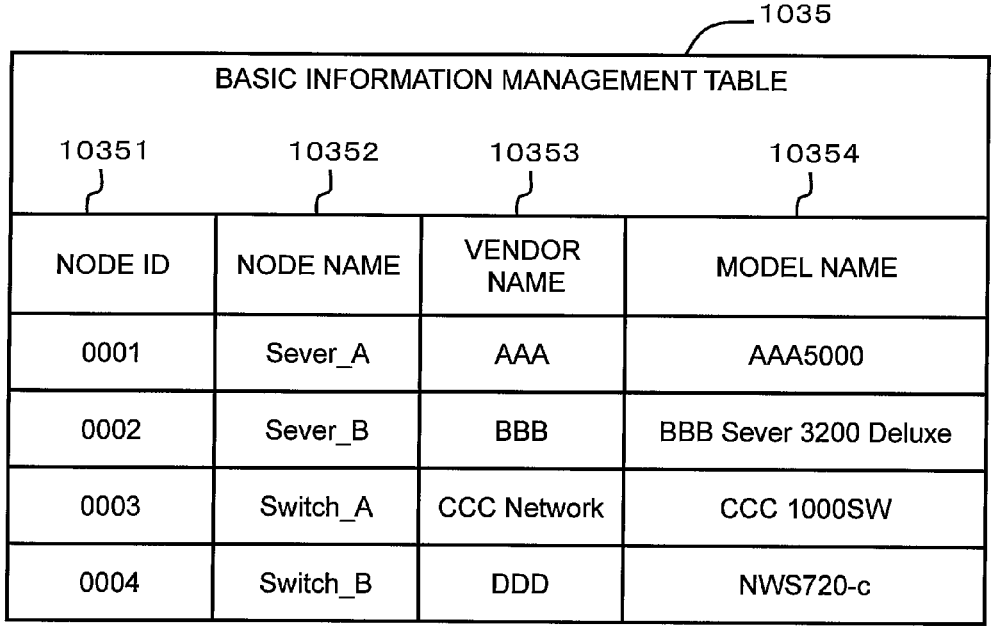
FIG. 9 shows a basic information management table.

FIG. 9 shows the basic information management table 1035. The basic information management table 1035 manages basic information that is able to be acquired from the node apparatus 20 without any particular effort on the part of the system management apparatus 10.

The basic information management table 1035, for example, comprises a node ID 10351, a node name 10352, a vendor name 10353, and a model name 10354. The node ID 10351 is information for identifying a node apparatus 20. The node name 10352 is the name of a node apparatus. The node name may also denote the node type. The vendor name 10353 is information for identifying either the manufacturer or the distributor who provided the node apparatus 20. The model name 10354 is information showing the model of the node apparatus 20.

Figure 10:
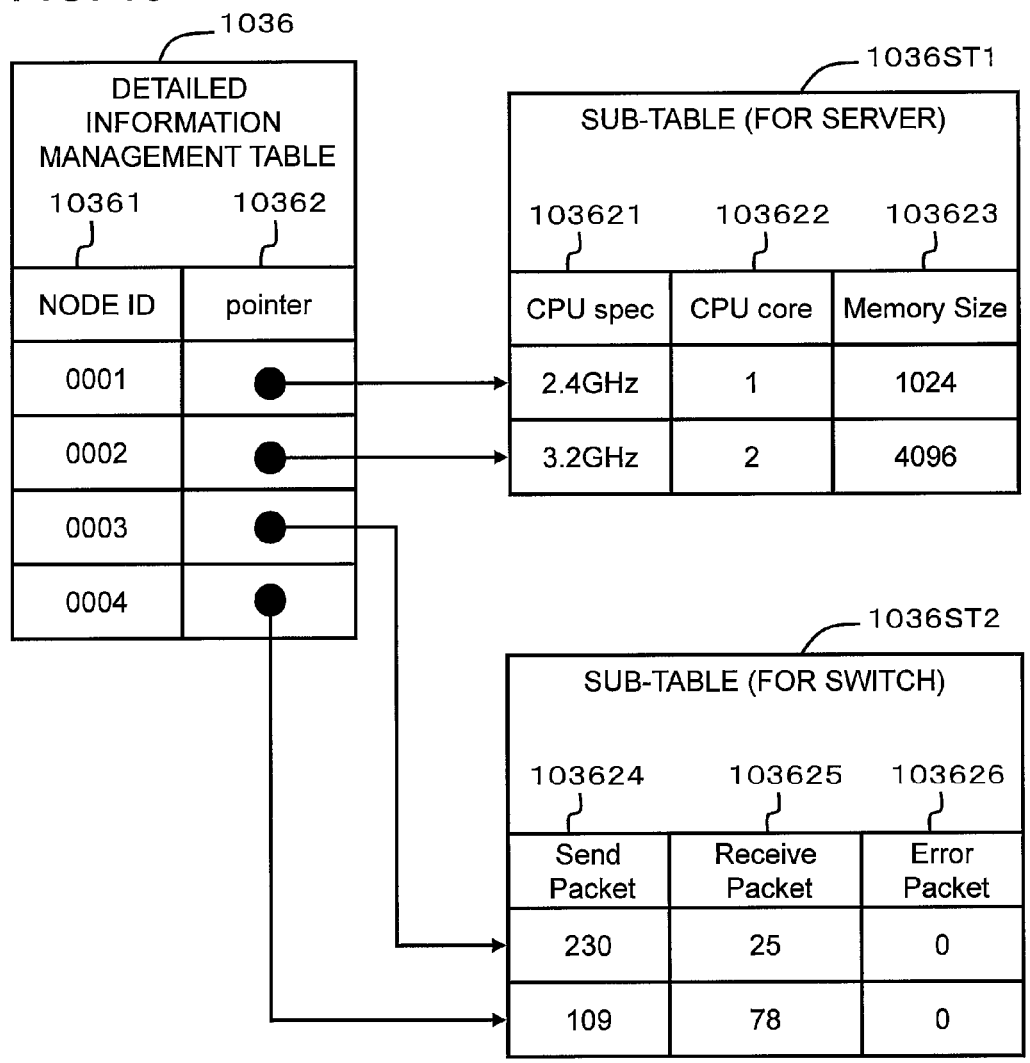
FIG. 10 shows a detailed information management table.

FIG. 10 shows the detailed information management table 1036. The detailed information management table 1036 manages detailed information that is able to be acquired from the node apparatus 20 without any particular effort on the part of the system management apparatus 10 the same as the basic information management table 1035. Furthermore, when basic information is acquired, there may be a case where node apparatus authentication is necessary and a case where authentication is not necessary. The same holds true in the case of the detailed information.

The authentication information management table 1036, for example, comprises a node ID 10361 and a pointer 10362 denoting a sub-table. A sub-table 1036ST1, 1036ST2 is prepared for each type of node apparatus. The one sub-table 1036ST1 shown in FIG. 10 is a sub-table for a server computer. The other sub-table 1036ST2 shown in FIG. 10 is a sub-table for a switch (IP-SW).

The server computer sub-table 1036ST1, for example, comprises CPU specifications 103621, a number of CPU cores 103622, and a memory size 103623. The detailed information acquired from each management-target server computer is stored in the one sub-table 1036ST1.

The switch sub-table 1036ST2, for example, comprises a number of sent packets 103624, a number of received packets 103625, and a number of error packets 103626. The detailed information acquired from each management-target network apparatus (switching apparatus) is stored in the other sub-table 1036ST2.

Furthermore, although omitted from the drawing, a sub-table for a storage apparatus is also provided. The storage apparatus sub-table, for example, could manage the number of logical volumes and/or the number of communication ports as the detailed information.

Figure 11:
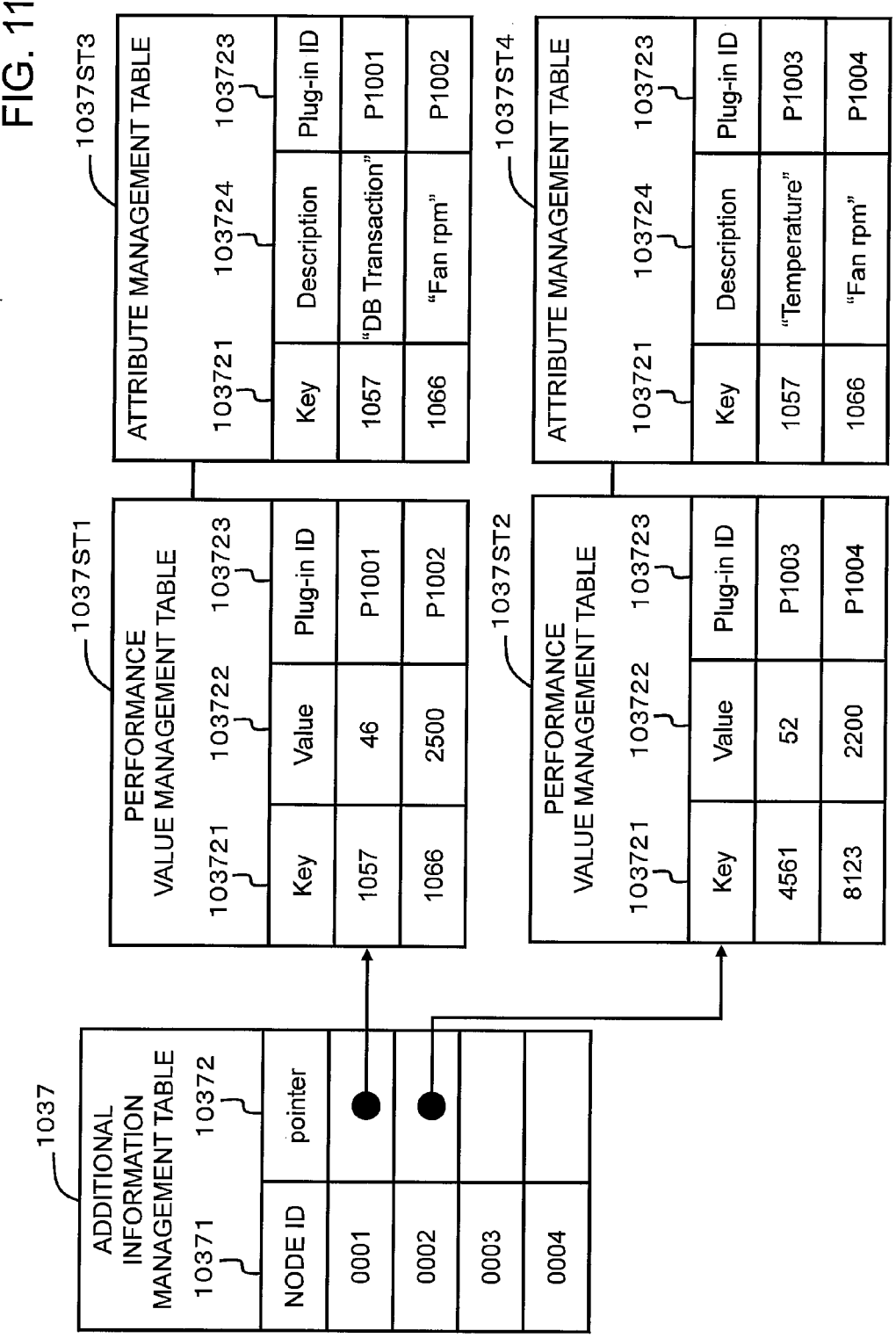
FIG. 11 shows an additional information management table.

FIG. 11 shows an example of the additional information management table 1037. The additional information management table 1037 manages the additional information acquired from the node apparatus 20 using a plug-in. The additional information management table 1037, for example, comprises a node ID 10371, and a pointer 10372 to a sub-table.

A sub-table is prepared for each node apparatus 20. The sub-tables include performance value management tables 1037ST1, 1037ST2, and attribute management tables 1037ST3, 1037ST4. That is, a performance value management table and an attribute management table is made correspondent to each node apparatus.

The performance value management tables 1037ST1 and 1037ST2 manage performance values acquired from the node apparatus 20 via the plug-in. The performance value management tables 1037ST1 and 1037ST2, for example, comprise a key 103721, a value 103722, and a plug-in ID 103723. The key 103721 shows the attribute of the value 103722. The plug-in ID 103723 is information for identifying the plug-in definition 1034 used to acquire the value 103722.

The attribute management tables 1037ST3 and 1037ST4 comprise the key 103721, a description 103724, and the plug-in ID 103723. The description 103724 shows the contents of the key 103721.

Figure 12:
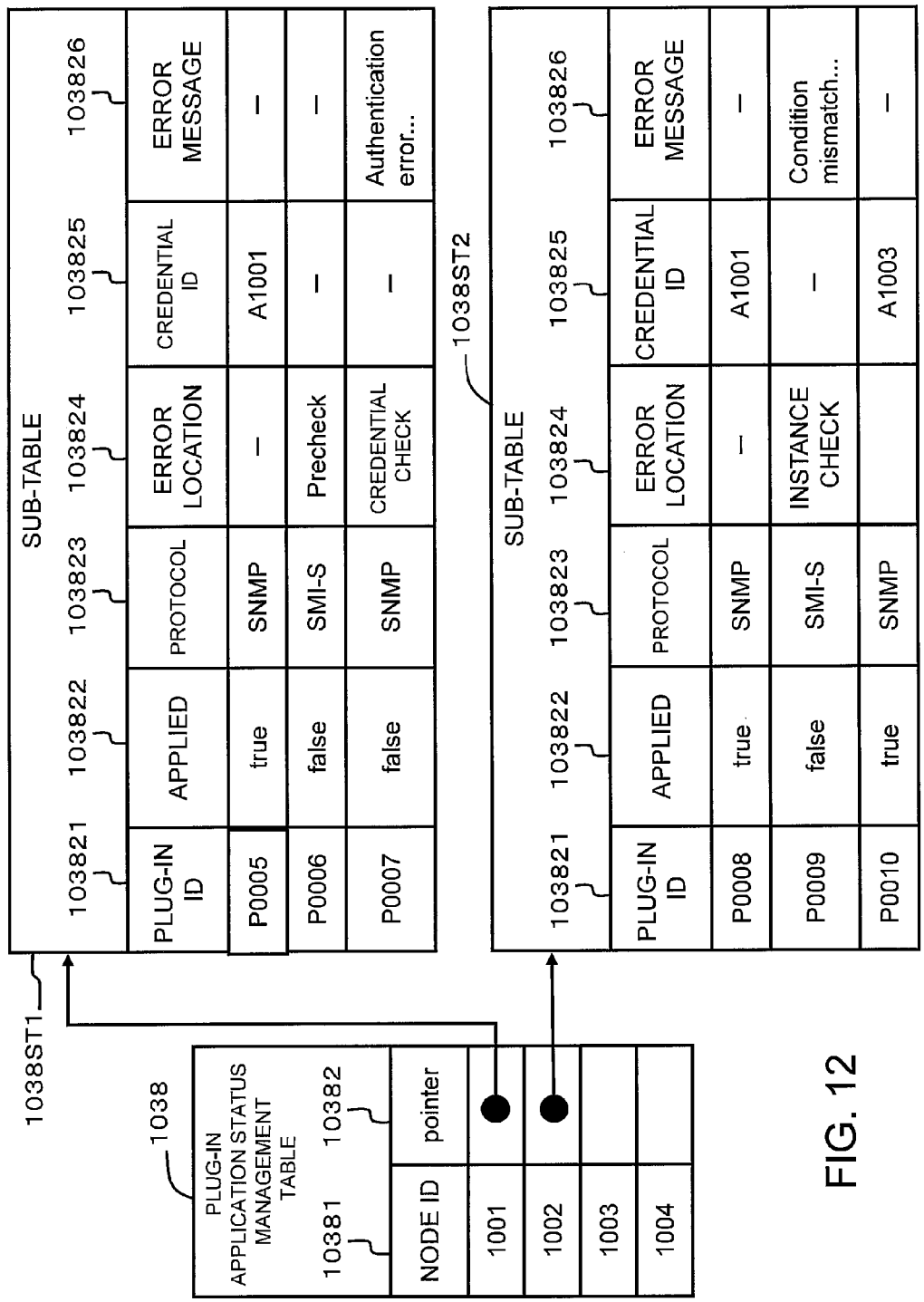
FIG. 12 shows a plug-in application status management table.

FIG. 12 shows an example of the plug-in application status management table 1038. The plug-in application status management table 1038 manages the application status of each plug-in in each node apparatus 20. The plug-in application status management table 1038 comprises a node ID 10381 and a pointer 10382 to a sub-table.

A sub-table 1038ST1 and 1038ST2 is prepared for each node apparatus 20. The sub-tables 1038ST1 and 1038ST2, for example, comprise a plug-in ID 103821, an applied plug 103822, a communication protocol 103823, an error location 103824, a credential ID 103825, and an error message 103826.

The applied plug 103822 is information indicating whether or not a plug-in identified in the plug-in ID 103821 has been applied to the node apparatus 20. The communication protocol 103823 is information showing the communication protocol that the plug-in uses to acquire the additional information from the node apparatus 20.

The error location 103824 is information showing the process in which it was determined that a plug-in could not be applied from among a series of processes for determining whether or not the plug-in can be applied to the node apparatus 20. The series of processes for determining the advisability of applying a plug-in comprises the pre-check process, the credential check process, and the instance check process. In a case where the pre-check condition has not been satisfied, "pre-check" is recorded in the error location 103824. In a case where the credential check condition has not been satisfied, "credential check" is recorded in the error location 103824. In a case where the instance check condition has not been satisfied, "instance check" is recorded in the error location 103824. In a case where "false", which indicates a failed application, is recorded in the applied plug 103822, information denoting the process in which the error occurred is recorded in the error location 103824.

A message for notifying the user when an error occurs is stored in the error message 103826. For example, a message, such as "Plug-in P0007 failed credential check" is stored in the error message 103826 beforehand.

Figure 13:
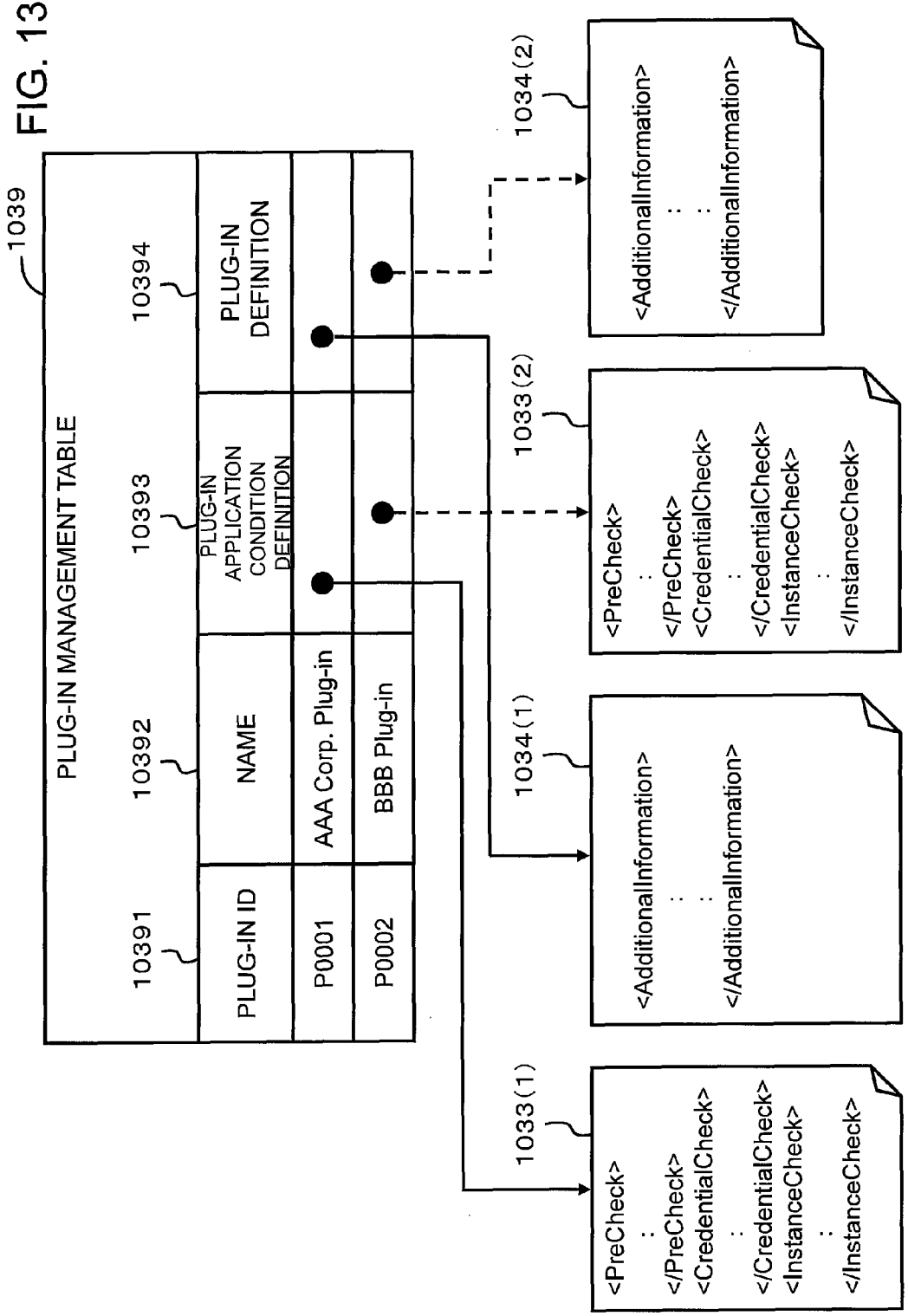
FIG. 13 shows a plug-in management table.

FIG. 13 shows the plug-in management table 1039. The plug-in management table 1039 is for managing the respective plug-ins. The plug-in management table 1039, for example, comprises a plug-in ID 10391, a name 10392, a pointer 10393 for referencing the plug-in application condition definition 1033, and a pointer 10394 for referencing the plug-in definition 1034.

The name 10392 is the name of a plug-in. The pointer 10393 is information for referencing the plug-in application condition definition 1033. The other pointer 10394 is information for referencing the plug-in definition 1034.

FIG. 14 shows an example of the apparatus-side basic information 2022. The apparatus-side basic information 2022 is held in each node apparatus 20. The apparatus-side basic information 2022, for example, stores as basic information a hostname 20221, a vendor name 20222, and a model name 20223.

FIG. 15 shows an example of the apparatus-side detailed information 2023. The apparatus-side detailed information 2023 is stored in the memory 202 of the node apparatus 20 the same as the apparatus-side basic information 2022. In the case of a server computer, for example, a CPU specification 20231, a number of CPU cores 20232, and a memory size 20233 are stored as detailed information in the apparatus-side detailed information 2023. As described using FIG. 10, the items of the detailed information will differ in accordance with the type of the node apparatus.

Figure 16:
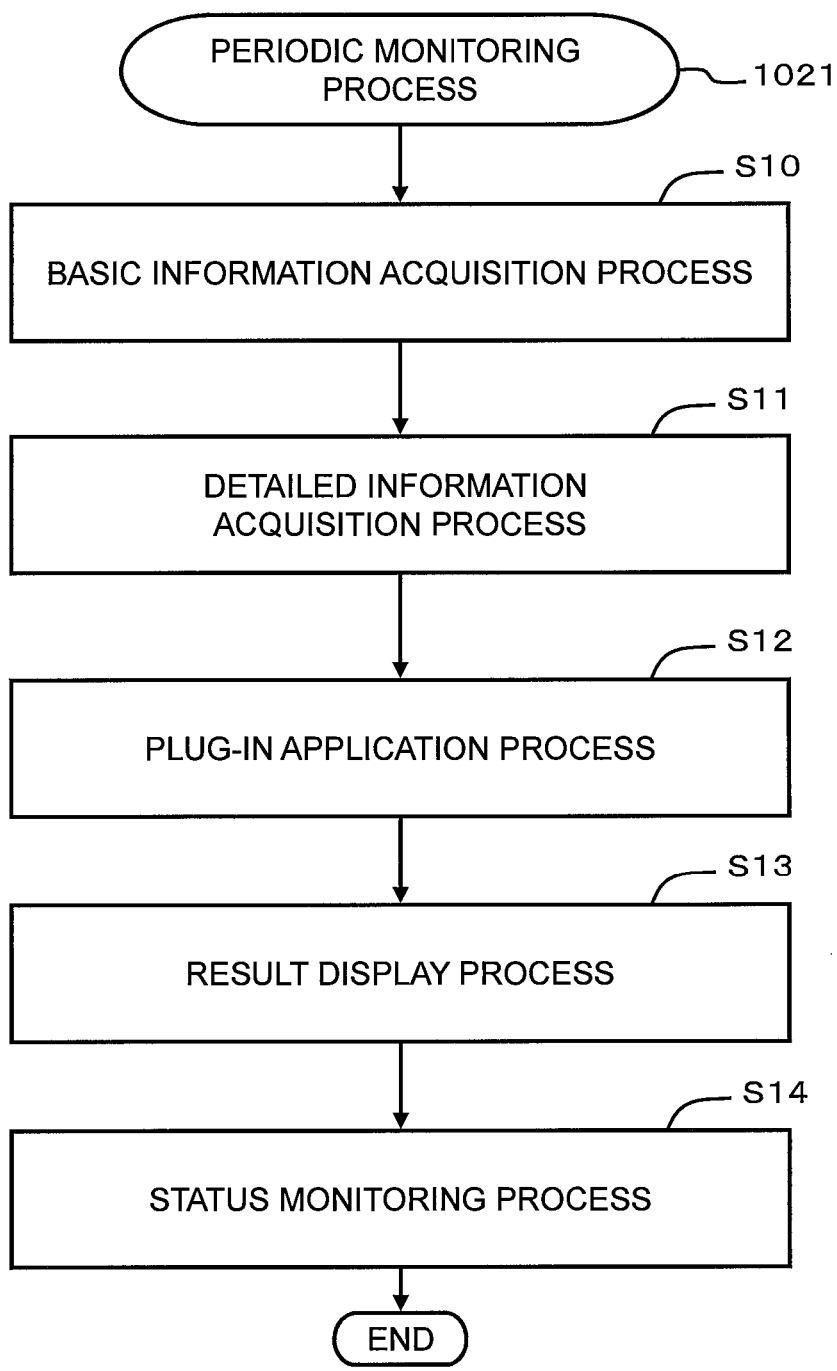
FIG. 16 is a flowchart of a periodic monitoring process.

FIG. 16 shows a flowchart of the periodic monitoring process. The processing in the flowchart shown in FIG. 16 is realized by the execution of the periodic monitoring program 1021. For the sake of convenience, the system management apparatus will be used as the subject hereinafter.

The system management apparatus 10 executes a process for acquiring the basic information from each node apparatus 20 (S10) and a process for acquiring the detailed information from each node apparatus 20 (S11). In addition, the system management apparatus 10 executes a process for applying a plug-in (S12). S12 will be explained in detail further below.

After the plug-in application process has ended, the system management apparatus 10 executes a process for displaying the plug-in application result on a screen (S13). Lastly, the system management apparatus 10 monitors each node apparatus 20 (S14) based on the information (performance information, status information, and so forth) collected from each node apparatus 20.

The basic information acquisition process (S10), for example, is executed at a frequency of around once a week. The detailed information acquisition process (S11), the plug-in application process (S12), the result display process (S13) and the status monitoring process (S14), for example, are shorter than the basic information acquisition process, and are executed at a frequency of around once a day.

Since the basic configuration of a computer system very seldom changes dramatically, the basic information acquisition cycle may be configured longer. By contrast, because new plug-ins are installed and/or user IDs or passwords are changed relatively frequently, the processes of S11 through S14 are executed on a shorter cycle. Furthermore, the above-mentioned cycle setting is merely an example for explanation purposes. The configuration may also be such that the cycle for executing the processes S11 through S14 differs for each process. The execution cycle for the status monitoring process (S14), for example, may be shortened even more to around once an hour.

Figure 17:
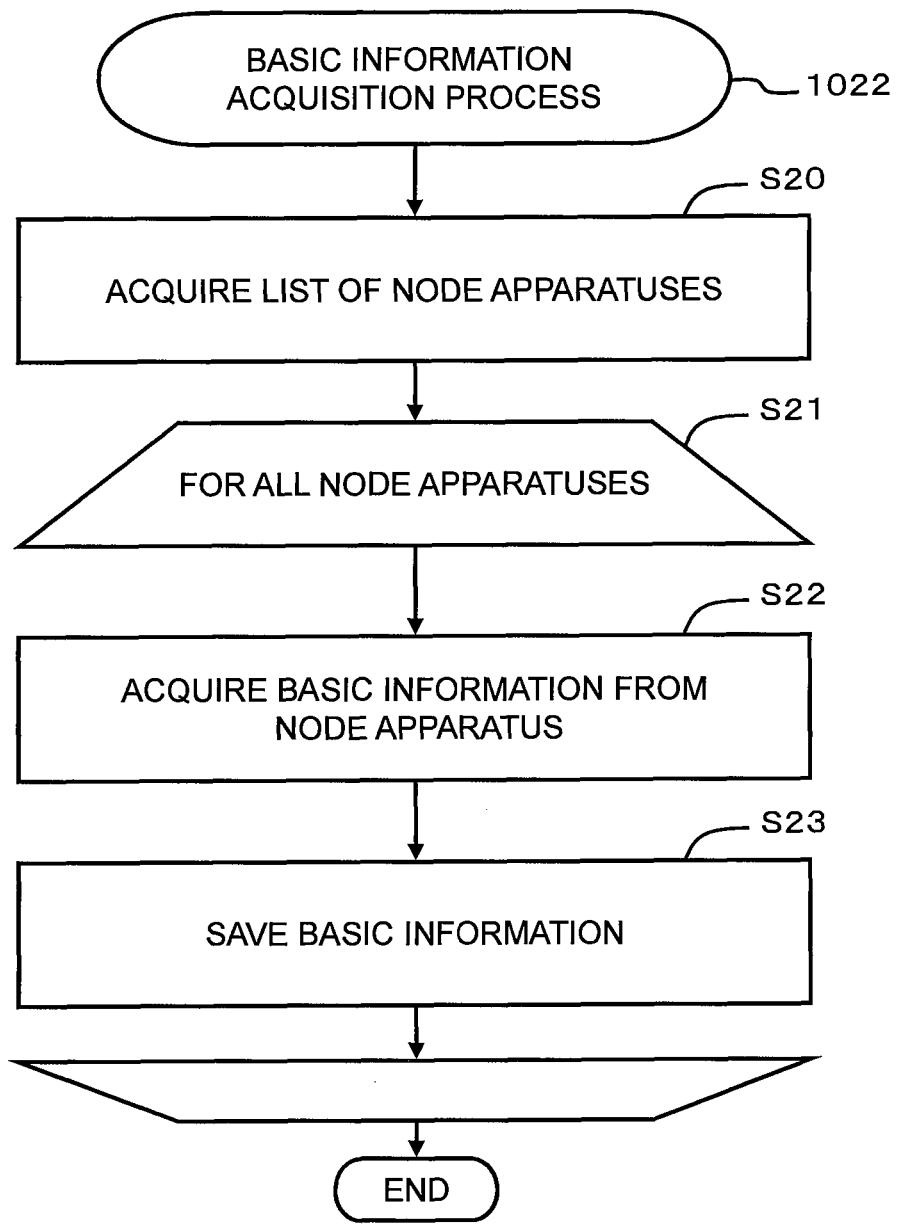
FIG. 17 is a flowchart of a basic information acquisition process.

FIG. 17 is a flowchart of the basic information acquisition process. This process corresponds to the step S10 in FIG. 16. This process is realized by the execution of the basic information acquisition program 1022.

The system management apparatus 10 acquires a list of node apparatuses from the node apparatus table 1031 (S20), and executes S22 and S23 with respect to all of the node apparatuses 20 (S21). That is, the system management apparatus 10 acquires the basic information (the apparatus-side basic information 2022) from the node apparatus 20 (S22). The system management apparatus 10 saves the acquired basic information to the basic information management table 1035 (S23).

Figure 18:
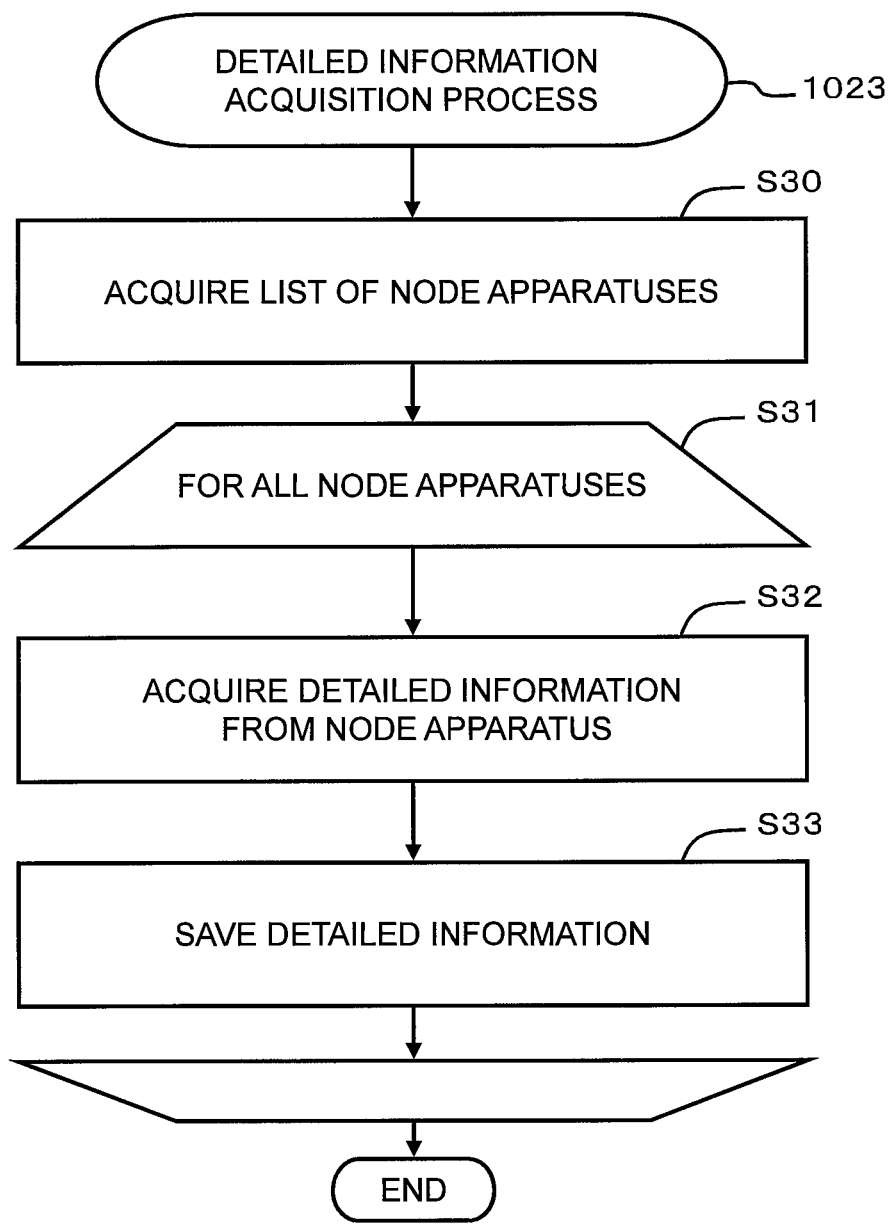
FIG. 18 is a flowchart of a detailed information acquisition process.

FIG. 18 is a flowchart of the detailed information acquisition process. This process corresponds to the step S11 in FIG. 16. This process is realized by the execution of the detailed information acquisition program 1023.

The system management apparatus 10 acquires a list of node apparatuses from the node apparatus table 1031 (S30), and executes S32 and S23 with respect to all of the node apparatuses 20 (S31). That is, the system management apparatus 10 acquires the detailed information (the apparatus-side detailed information 2023) from the node apparatus 20 (S32). The system management apparatus 10 saves the acquired detailed information to the detailed information management table 1036 (S33).

Figure 19:
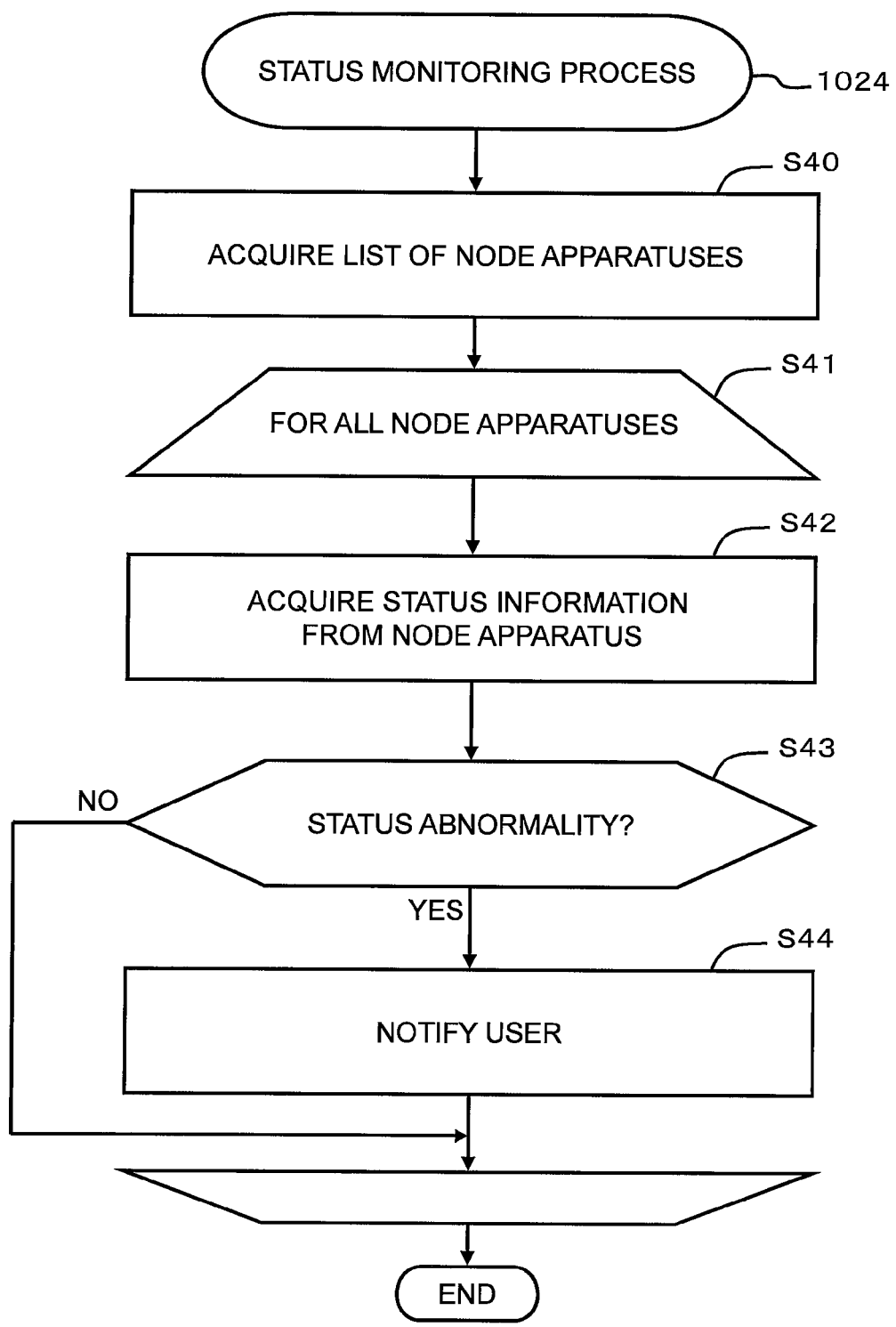
FIG. 19 is a flowchart of a status monitoring process.

FIG. 19 is a flowchart of the status monitoring process. This process corresponds to the step S13 in FIG. 16. This process is realized by the execution of the status monitoring program 1024.

The system management apparatus 10 acquires a list of node apparatuses from the node apparatus table 1031 (S40), and executes S42, S43 and S44 with respect to all of the node apparatuses (S41). That is, the system management apparatus 10 acquires the status information (including the performance information) from the node apparatus 20 (S42), and determines whether or not an abnormality has occurred (S43). In a case where an abnormality has occurred (S43: YES), the system management apparatus 10 notifies the user via the input/output terminal 30 (S44). Or, the user may also be notified of an abnormality by sending an e-mail to the user's mobile terminal (to include a mobile telephone).

Figure 20:
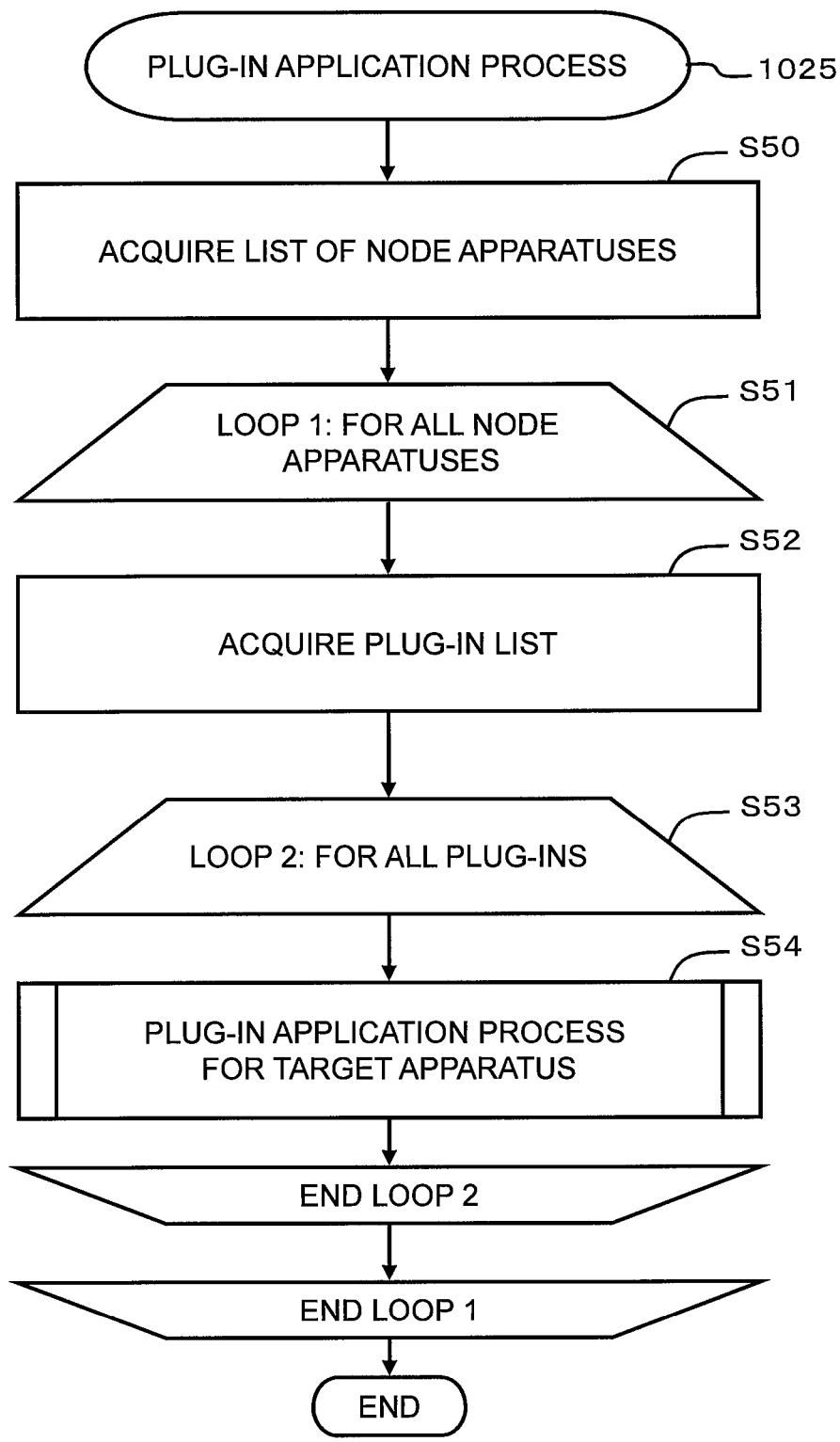
FIG. 20 is a flowchart of a plug-in application process.

FIG. 20 is a flowchart of the plug-in application process. This process corresponds to the step S12 in FIG. 16. This process is realized by the execution of the plug-in application program 1025.

The system management apparatus 10 acquires a list of node apparatuses from the node apparatus table 1031 (S50), and executes S52, S53 and S54 with respect to all of the node apparatuses (S51). That is, the system management apparatus 10 acquires a list of plug-ins from the plug-in management table 1039 (S52), and executes S54 with respect to all of the plug-ins (S53). The system management apparatus 10 makes a determination as to the application of a plug-in to a target apparatus (the node apparatus being targeted for processing) (S54).

That is, in the processing of FIG. 20, a determination is made for the respective node apparatuses 20 as to whether or not each individual plug-in is able to be applied. However, in this example, as will be described in detail using FIG. 21, the time required to complete S54 can be shortened since a plug-in application candidate is narrowed down beforehand on the basis of the basic information and the detailed information.

Figure 21:
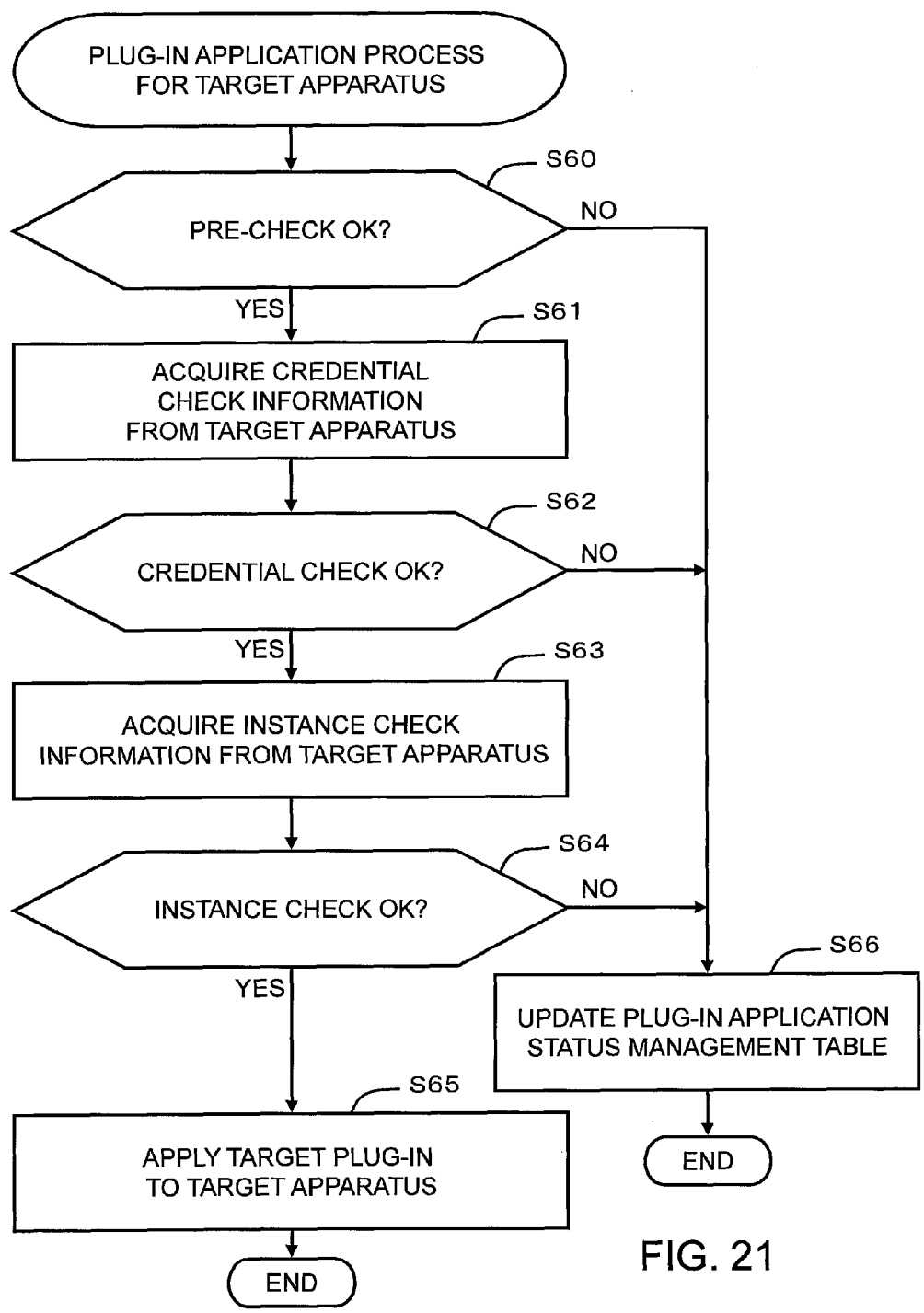
FIG. 21 is a flowchart showing a process for applying a plug-in to each target apparatus.

FIG. 21 shows the details of S54 in FIG. 20. The system management apparatus 10 determines whether or not the target apparatus 20 satisfies the pre-check condition with respect to the target plug-in (S60). For example, in a case where the name of the vendor that provided the target apparatus 20 does not match the vendor name described in the pre-check condition 10331 corresponding to the target plug-in (S60: NO), the target apparatus 20 is not eligible for target plug-in application.

Therefore, the system management apparatus 10 configures "false" in the applied plug 103822 corresponding to the target plug-in of the target apparatus in the plug-in application status management table 1038 (S66).

The basic information and detailed information can be collected from the respective node apparatuses 20 prior to executing the process for determining the advisability of a plug-in application here. Therefore, it is possible to determine whether or not the pre-check condition has been satisfied based on the acquired basic information and detailed information without accessing the target node apparatus in S60. This makes it possible to determine the advisability of applying each plug-in to each node apparatus without increasing the load placed on the communication network CN.

In a case where the target apparatus satisfies the pre-check condition (S60: YES), this target apparatus becomes the plug-in application candidate. The system management apparatus 10 attempts to acquire the credential check information from the target apparatus by using the credential to access the target apparatus that has passed the pre-check (S61).

As described using FIG. 7, the credential check condition 10332 makes it possible to access the node apparatus 20 using a predetermined communication protocol and acquire credential check information from a predetermined location. In order to acquire the credential check information from the predetermined location, the node apparatus 20 authentication must succeed. As described using FIG. 6, either one or multiple credentials (a user ID, password) is made to correspond to each communication protocol beforehand.

The system management apparatus 10 sequentially tries each credential of each communication protocol with respect to the target plug-in, and attempts to acquire the credential check information from the predetermined location (S61). The system management apparatus 10 determines whether or not the credential check condition has been satisfied (S62). In a case where the credential check information could not be acquired from the target apparatus even though all of the credentials were tried for each of the communication protocols (S62: NO), the system management apparatus 10 configures "false" in the corresponding applied plug 103822, and updates the plug-in application status management table 1038 (S66).

In a case where it was possible to read the credential check information from the predetermined location of the target apparatus (S62: YES), the system management apparatus 10 attempts to acquire the instance check information from the target apparatus (S63).

The instance check information is predetermined information that is defined in the instance check condition 10333, and, for example, corresponds to a version number or the like. The instance check is the last check for confirming that the target plug-in is able to be applied to the target apparatus.

The system management apparatus 10 uses the communication protocol and credential that succeeded in S62 to access the target apparatus once again, and acquires the instance check information from another predetermined location of the target apparatus.

The system management apparatus 10 determines whether or not the instance check information acquired from the target apparatus matches the instance check condition 10333 (S64). In a case where the instance check condition is satisfied (S64: YES), the system management apparatus 10 applies the target plug-in to the target apparatus (S65). Furthermore, in S65, the system management apparatus 10 configures "true" in the corresponding applied plug 103822, and updates the plug-in application status management table 1038.

Alternatively, in a case where the instance check condition is not satisfied (S64: NO), the system management apparatus 10 configures "false" in the corresponding applied plug 103822, and updates the plug-in application status management table 1038 (S66).

Figure 22:
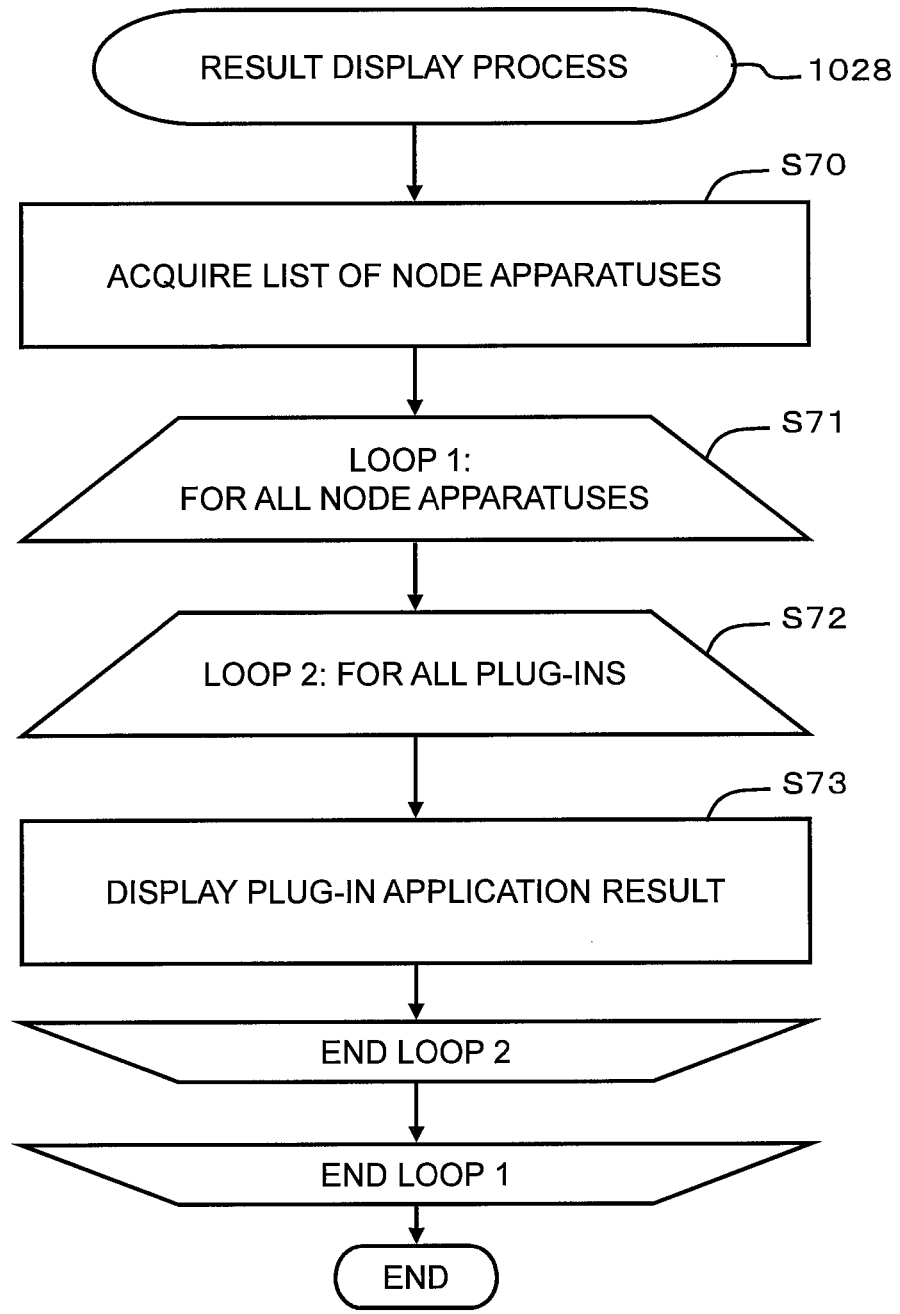
FIG. 22 is a flowchart of a process for displaying a plug-in application result.

FIG. 22 is a flowchart of the result display process. This process corresponds to the step S13 in FIG. 16. This process is realized by the execution of the result display program 1028.

The system management apparatus 10 acquires a list of node apparatuses from the node apparatus table 1031 (S70), and executes S72 and S73 with respect to all of the node apparatuses (S71). The system management apparatus 10 displays (S73) the plug-in application results for all of the plug-ins (S72).

FIG. 23 is an example of a screen G10 for displaying the plug-in application result. The result display screen G10, for example, comprises a status G101, a node name G102, a plug-in name G103, a communication protocol G104, a credential G105, a date/time G106, and a description G107.

The status G101 shows whether or not a plug-in has been applied to a node apparatus. A case where "OK" has been configured indicates that the plug-in has been applied to the node apparatus. A case where "Error" has been configured indicates that the plug-in could not be applied to the node apparatus.

For the sake of expediting the explanation, the advisability of plug-in application is shown one at a time for each node apparatus in FIG. 23. However, in reality, it is possible to apply multiple plug-ins to multiple node apparatuses.

The communication protocol G104 shows the communication protocol that the plug-in uses to acquire the information from the node apparatus. The credential G105 shows the information used in the node apparatus authentication process. The date/time G106 shows the date and time of a determination on plug-un application advisability. The description G107 is a message showing a plug-un application advisability result. In a case where the plug-in has been applied, for example, a message stating "succeeded" is displayed. In a case where it was not possible to pass the pre-check, for example, a message stating "Ineligible node" is displayed. In a case where the credential check has failed, for example, a message stating "No corresponding authentication information" is displayed. The authentication information is the credential. In a case where the instance check has failed, for example, a message stating "Instance check result: ineligible node" is displayed.

Figure 24:
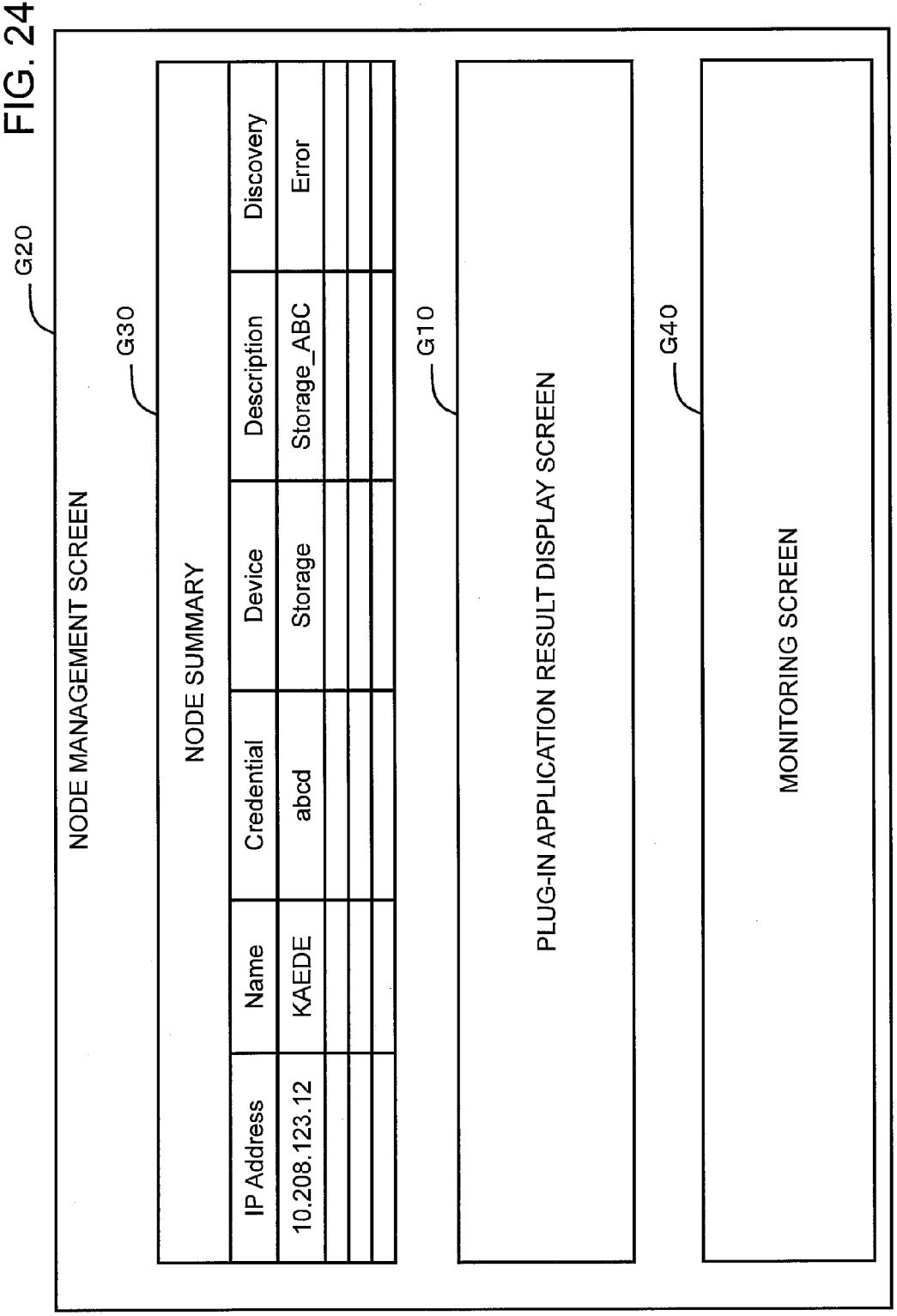
FIG. 24 shows a node management screen.

FIG. 24 shows a node management screen G20. The node management screen G20 is for managing the respective management-target node apparatuses 20. The node management screen G20, for example, comprises the plug-in application result display screen G10 described using FIG. 23, a node summary screen G30, and a monitoring screen G40.

The node summary screen G30, for example, displays respective attributes, such as an IP address, a node name, a credential, a device type, a node description, and a discovery status for each node in the summary.

The monitoring screen G40 displays a monitoring result based on the status information and/or the performance information acquired from each node apparatus. For example, an icon or the like showing the occurrence of an abnormal state is displayed for a node apparatus in which an abnormal state has occurred. In addition, an icon or the like for alerting the user is displayed for a node apparatus in which a memory shortage or other such state has occurred.

Being configured like this, in this example, the system management apparatus 10 narrows down the node apparatuses that constitute candidates for the application of a plug-in by carrying out a pre-check based on the basic information and the detailed information that was able to be collected from each node apparatus 20 beforehand without using a plug-in. This example makes it possible to narrow down the node apparatuses 20 to which a plug-in is applicable from among the numerous node apparatuses comprising the computer system, and to make a determination as to the advisability of applying the plug-in. Therefore, the time required to determine the advisability of applying a plug-in can be shortened, and management efficiency can be enhanced.

In this example, the credential check is implemented with respect to a node apparatus that has passed the pre-check, and an instance check is only carried out when the credential check has been passed. Furthermore, it is assumed that the processing time for the credential check will be shorter than the processing time for the instance check, but this may not always be the case.

Since the instance check is only implemented with respect to a node apparatus that has passed the credential check, the time required for the credential check and the instance check can be shortened. This is because the instance check is not carried out for a node that has failed the credential check. Furthermore, the credential check process is traditionally a process for the system management apparatus to determine the advisability of using the stored authentication information, but this may not always be the case. For example, a process that is not directly related to the advisability of using the authentication information may be included, and a portion of the processing that contributes to the determination as to the advisability of using the authentication information may be included in the instance check process. Naturally, for reasons other than this, either all or a part of the processing that should be carried out in the instance check may be integrated into the credential check, and, alternatively, either all or a part of the processing that should be carried out in the credential check may be integrated into the instance check.

Example 2

A second example will be explained by referring to FIGS. 25 and 26. Since the following examples, to include this example, correspond to variations of the first example, the explanations will focus on the points of difference with the first example. In this example, the result of a credential check is recorded, and this result is used in the credential check for the next plug-in.

Figure 25:
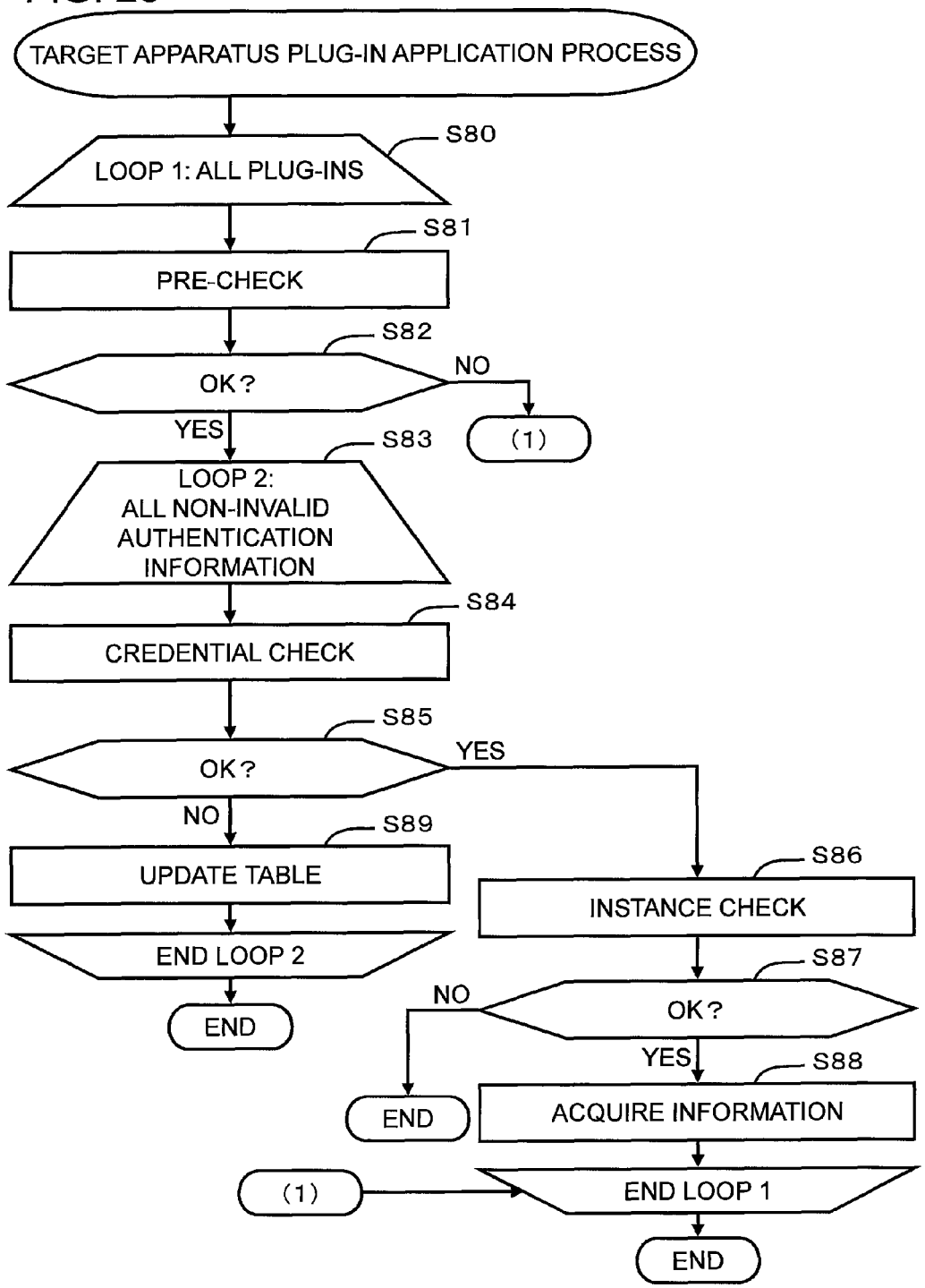
FIG. 25 is a flowchart showing a plug-in application process for each target apparatus related to a second example.

FIG. 25 is a flowchart of a plug-in application process for a target apparatus. This process is executed in S54 of FIG. 20 instead of in the processing shown in FIG. 21.

The system management apparatus 10 executes S81 through S88, which will be explained further below, with respect to all the plug-ins (S81). The system management apparatus 10 carries out a pre-check with respect to a combination of the target plug-in and the target apparatus (S81), and determines whether or not the target apparatus satisfies the pre-check condition (S82). In a case where the pre-check condition is not satisfied (S82: NO), processing ends before proceeding to the next target (S80).

In a case where the target apparatus satisfies the pre-check condition (S82: YES), the system management apparatus 10 executes S84, S85 and S89 with respect to all valid credentials (S83). FIG. 26 will be referred to at this point.

FIG. 26 shows an example of a credential management table 1032A. This table 1032A, for example, comprises a credential ID 103221, a credential name 103222, a user ID 103223, a password 103224, an etcetera 10322A, and a by-node apparatus application result 10322B.

The etcetera 10322A denotes the used flag 103225, the communication port number 103226, the community name 103227, and the namespace 103228 shown in FIG. 6. In an effort to conserve space, the above-mentioned items 103225 through 103228 are displayed as etcetera 10322A.

The by-node apparatus application result 10322B shows whether or not the credential is capable of being used in the node apparatus, that is, whether or not the node apparatus authentication succeeded using this credential. In a case where an authentication failed using this credential, "invalid" is configured in the application result 10322B of the node apparatus for which the authentication failed.

Return to S83 of FIG. 25. The system management apparatus 10 references the application result 10322B of the credential management table 1032A shown in FIG. 26, and carries out credential checks using all the credentials for which "invalid" has not been configured (S84). The credential for which "invalid" has been configured is clearly unable to be used in the node apparatus, and there is no reason to try it. Carrying out credential checks for a credential that is not "invalid" makes it possible to shorten the time required for the credential checks.

In a case where a credential check has failed (S85: NO), the system management apparatus 10 configures "invalid" in the application result 10322B of the target apparatus that failed the authentication with respect to the authentication-failed credential. S84, S85 and S89 are executed until all the credentials for which "invalid" has not been configured in the application result 10322B have been tried. Therefore, the usable credentials (the credentials that have not been configured as invalid) are gradually narrowed down the more the processing shown in FIG. 25 progresses.

When a target apparatus authentication succeeds in accordance with any credential (S85: YES), the system management apparatus 10 carries out an instance check (S86). The system management apparatus 10 determines whether or not the target apparatus satisfies the instance check condition (S87). In a case where the target apparatus satisfies the instance check condition (S87: YES), the system management apparatus 10 acquires predetermined information (any one or multiple of the configuration information, the performance information, and the status information) from the target apparatus (S88).

Being configured like this, this example also exhibits the same effects as the first example. In addition, in this example, the result (success/failure) of a target plug-in authentication process with respect to a target apparatus is recorded in the table 1032A, and this authentication process result is put to good use in an authentication process for the next combination of a target plug-in and a target apparatus. Therefore, it is possible to narrow down the number of credentials to be tried in the credential check process (S84), making it possible to shorten the time required for the credential checks.

In order to maintain security, it is preferable that the credential of each node apparatus be changed periodically. This is because the likelihood of an unauthorized access increases the longer the same credential is used. Therefore, the user will change the credential for each node apparatus either regularly or irregularly. Under normal circumstances, the time required for a credential check will become longer when the credential is changed.

However, in this example, because the target apparatuses are narrowed down as a result of the pre-checks, and, in addition, the credential checks are carried out using only the credentials that have not been determined invalid, the credential checks can be executed relatively quickly even when the credential is changed relatively frequently.

Example 3

Figure 27:
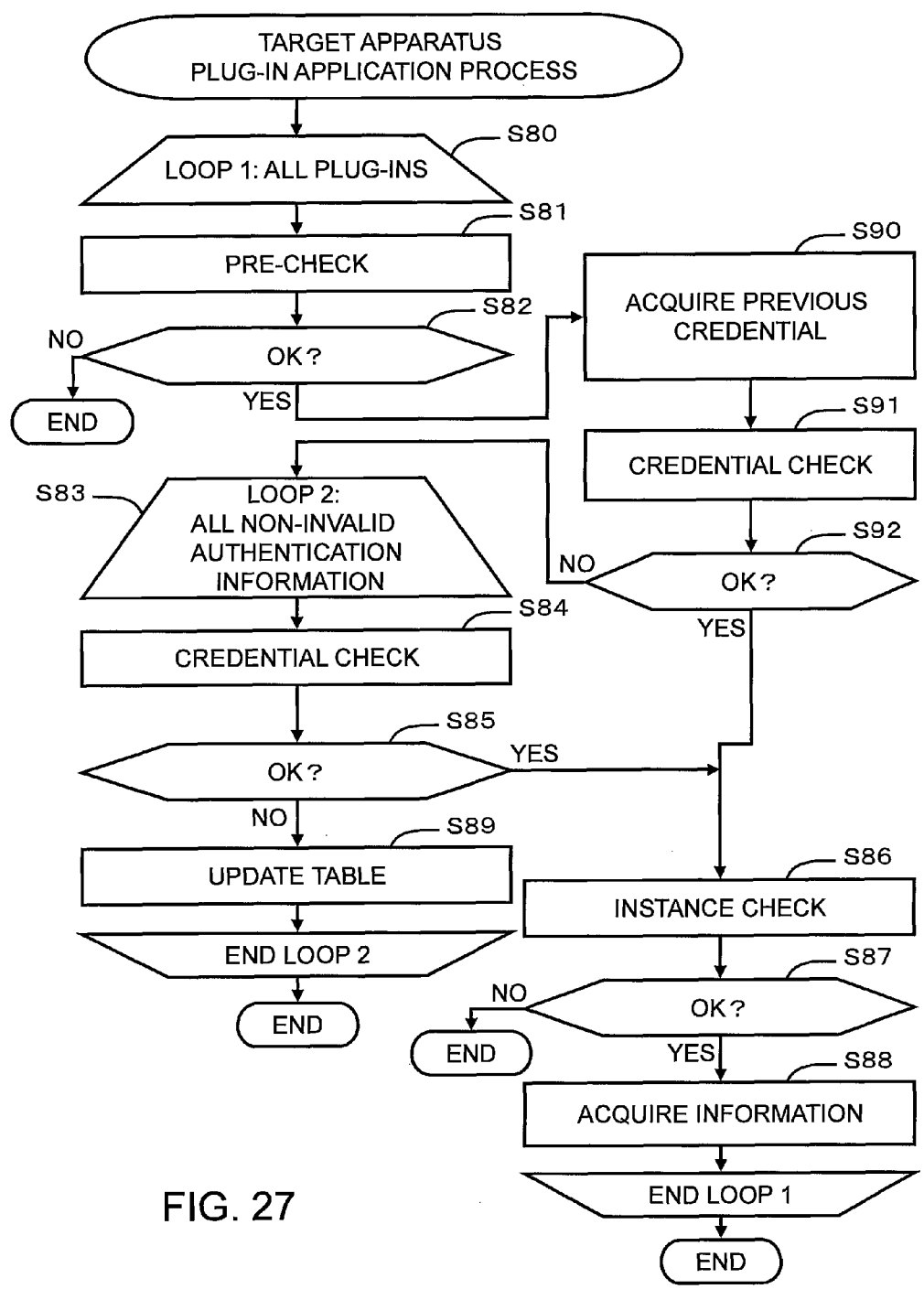
FIG. 27 is a flowchart showing a plug-in application process for each target apparatus related to a third example.

A third example will be explained by referring to FIG. 27. In this example, a credential check is carried out by initially using the credential that was able to be used the previous time. FIG. 27 is a flowchart of the plug-in application process for a target apparatus in accordance with this example. This process comprises all the steps S80 through S89 shown in FIG. 26. In addition, S90 through S92 are added anew in this process. Consequently, a new configuration will be explained.

When the target apparatus passes the pre-check (S82: YES), the system management apparatus 10 acquires the credential used the previous time for this target apparatus (S90), and carries out a credential check (S91). In a case where the target apparatus authentication succeeds using the previous credential (S92: YES), the system management apparatus 10 proceeds to the instance check (S86). In a case where the target apparatus authentication does not succeed using the previous credential (S92: NO), the system management apparatus 10 moves to S83, and carries out the credential check with respect to the target apparatus using all the credentials that have not been configured to invalid (S84).

Being configured like this, this example also exhibits the same effects as the first example and the second example. In addition, in this example, since the credential used the previous time is tried initially, the time required for credential checks can be shortened more than in the second example.

Example 4

A fourth example will be explained by referring to FIGS. 28 through 33. This example supports the user by showing the user the operation for resolving a failure when a node apparatus plug-in application has failed.

Figure 28:
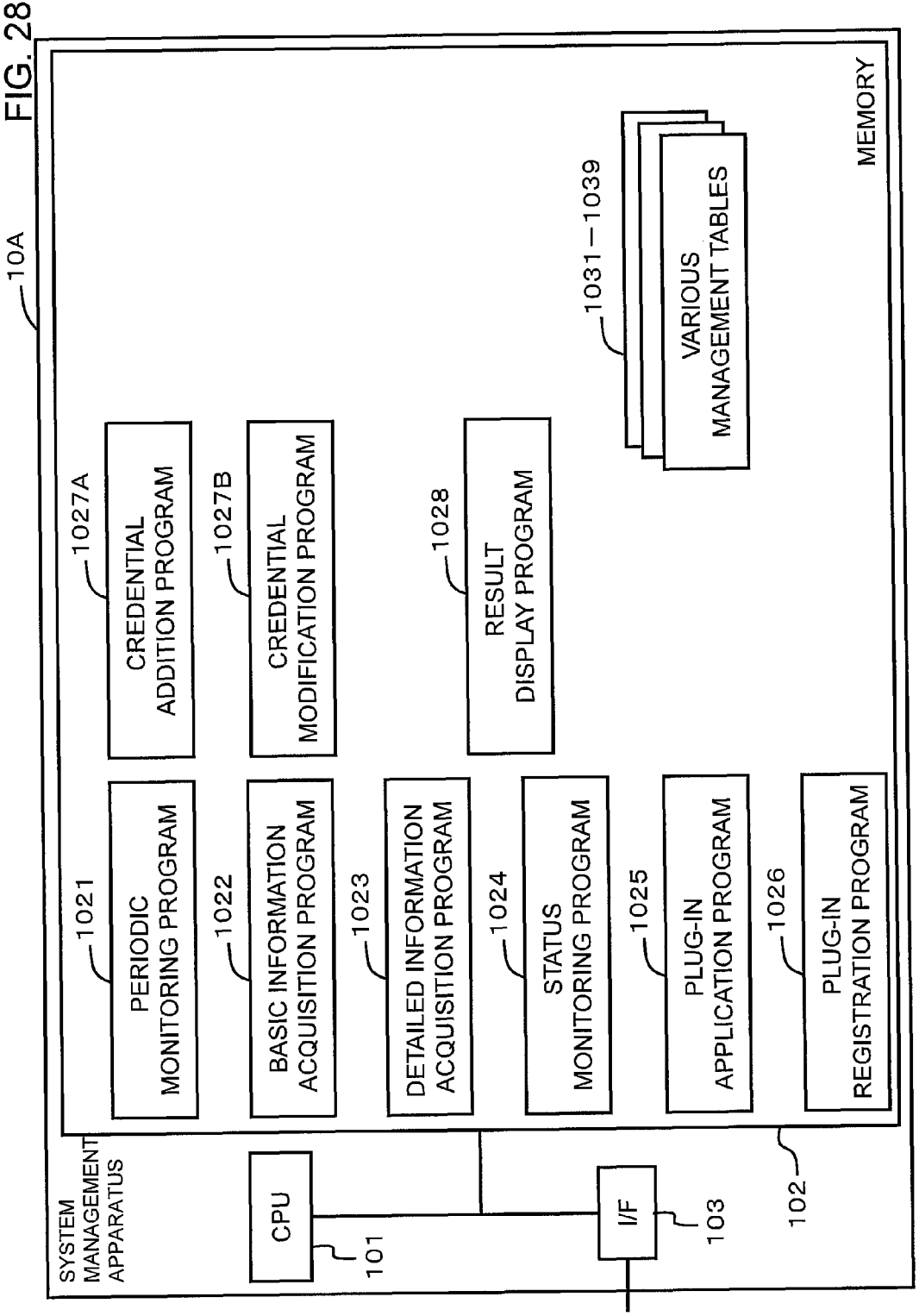
FIG. 28 is a block diagram of a system management apparatus related to a fourth example.

FIG. 28 shows a system management apparatus 10A of this example. In comparison to the system management apparatus 10 shown in FIG. 3, the system management apparatus 10A comprises a credential addition program 1027A and a credential modification program 1027B instead of the credential registration program 1027.

Figure 29:
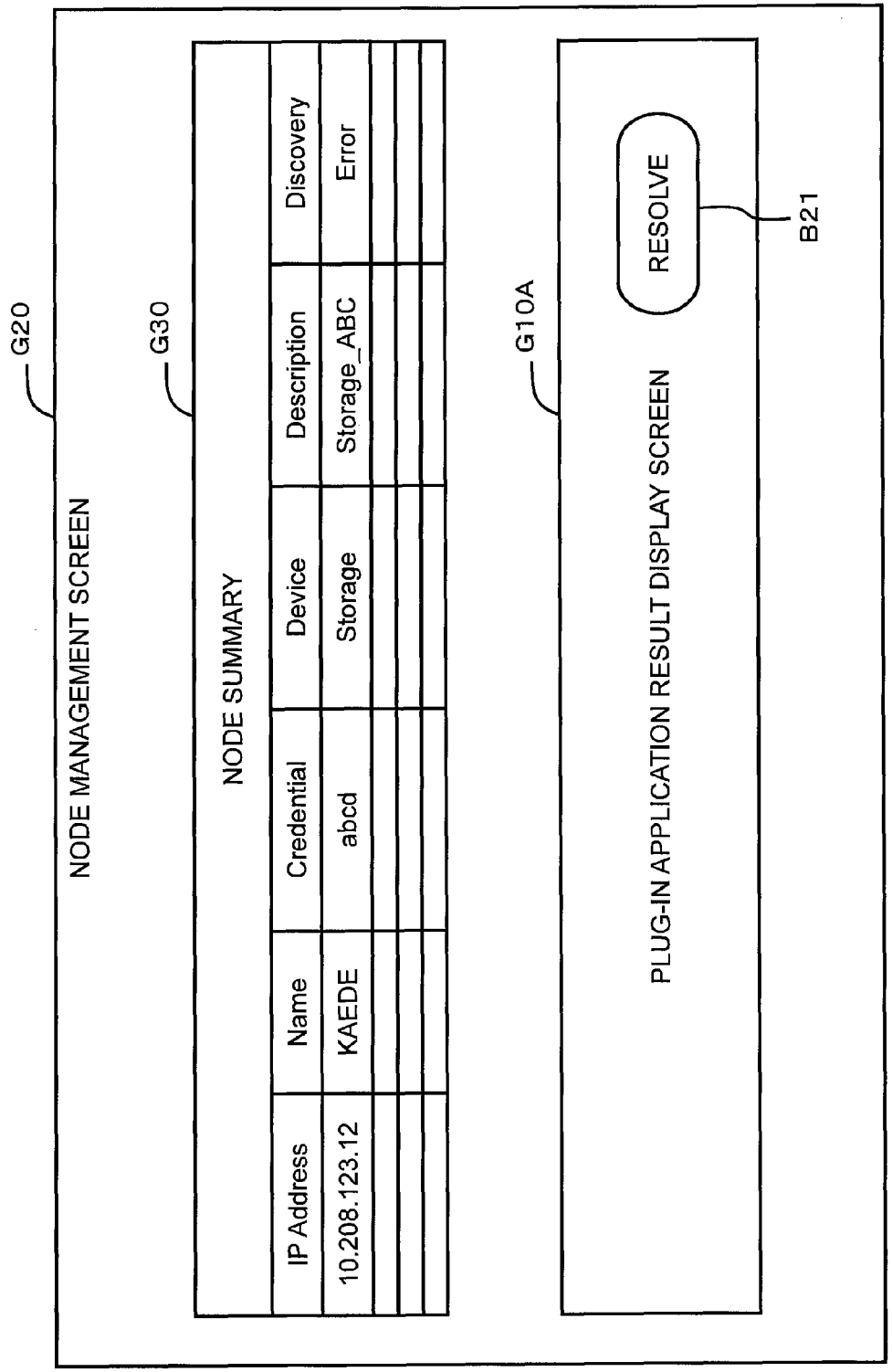
FIG. 29 shows a node management screen.

The credential addition program 1027A is for creating a new credential, and for adding and registering same in the credential management table 1032. The credential modification program 1027B is for restoring a credential that has been registered in the credential management table 1032. FIG. 29 shows an example of a plug-in application result display screen G10A included in the node management screen G20. The monitoring screen G40 is not shown in FIG. 29 for convenience sake, but the node management screen G20 may comprise the monitoring screen G40.

A resolve button B21 is displayed in the screen G10A for displaying the plug-in application result. When the user operates the resolve button B21, an authentication error resolution screen G50, which is shown in FIG. 30, is displayed.

The authentication error resolution screen G50 displays a node apparatus or the like that has failed a credential check and supports a user resolution. The authentication error resolution screen G50, for example, comprises a communication protocol display part G501, an error node display part G502, an unused credential display part G503, and a credential addition part G504.

The name of each communication protocol is displayed in the communication protocol display part G501. The authentication error resolution screen G50 teaches the user how to resolve an error for each communication protocol.

The error node display part G502 displays the name of the node apparatus in which an authentication error occurred for the communication protocol.

A modify button B51 for restoring a credential that is not being used in any node apparatus from among the credentials made correspondent to the communication protocol beforehand is displayed in the unused credential display part G503. The name of the unused credential is displayed in the modify button B51.

The fact that there is a node apparatus that has failed authentication while there exists a credential that has been prepared but is not being used indicates the possibility that there is a mistake in the description of the unused credential. For example, the node apparatus-side user ID or password could have been changed, or an error could have been made when inputting the credential that is registered in the system management apparatus. Therefore, the modify button 351 is displayed. When the user operates the modify button 351, a modification screen G60, which will be described further below, is displayed.

An add button B52 for adding and registering a new credential is displayed in the credential addition part G504. When the user operates the add button B51, an addition screen G70, which will be described further below, is displayed.

The fact that there is a node apparatus in which an authentication error has occurred even though an unused credential does not exist indicates the possibility that either the credential corresponding to this node apparatus has been deleted, or a new node apparatus has been added to the computer system. Consequently, the button B52 for creating and registering a new credential is displayed.

Furthermore, neither button B51 nor B52 is displayed for a communication protocol for which an error node apparatus does not exist.

Figure 31:
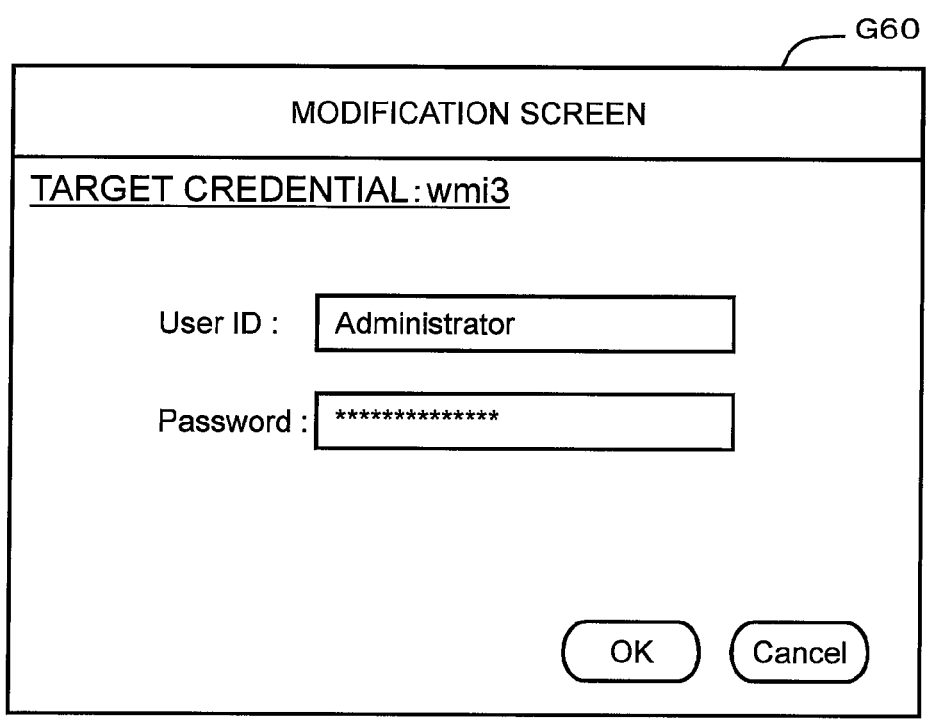
FIG. 31 shows a screen for restoring a credential.

FIG. 31 shows the modification screen G60. The user reads and restores the setting value of the existing credential from the credential management table 1032 (or 1032A). In this example, an ID and a password are displayed as an example of the WMI protocol, but a port number, community name, or namespace may be displayed in the case of another protocol.

Figure 32:
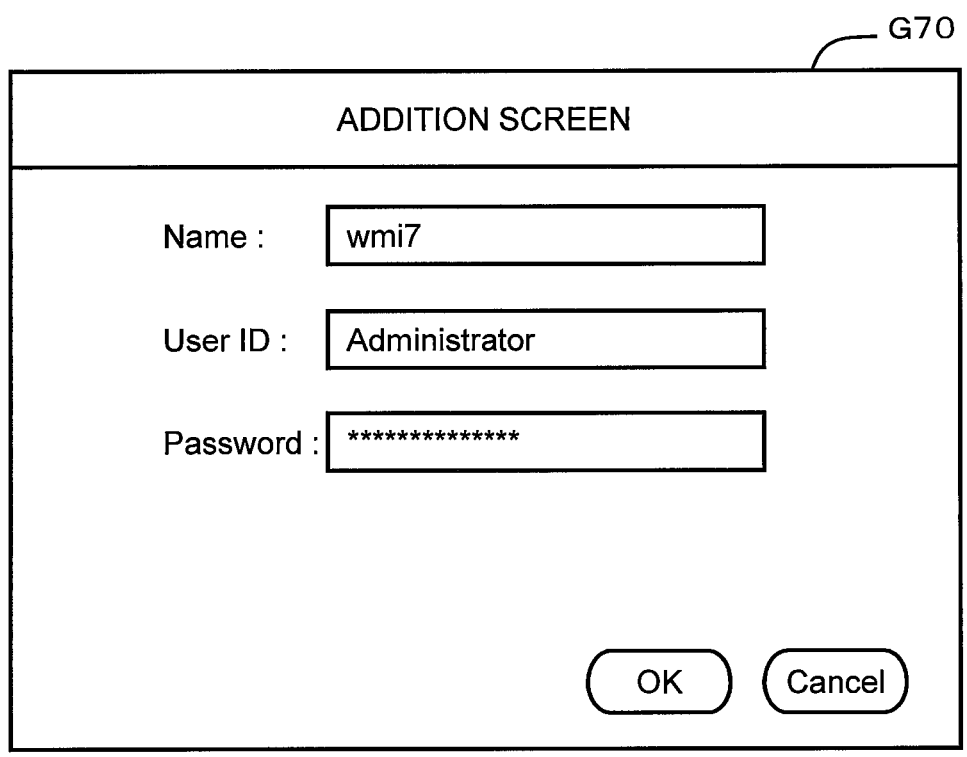
FIG. 32 shows a screen for creating a new credential.

FIG. 32 shows the addition screen G70. The user, for example, inputs the name of a newly created credential, a user ID and a password, thereby creating the credential and storing same in the credential management table 1032 (or 1032A). Furthermore, there may also be cases in which only one of the user ID or password is configured.

Figure 33:
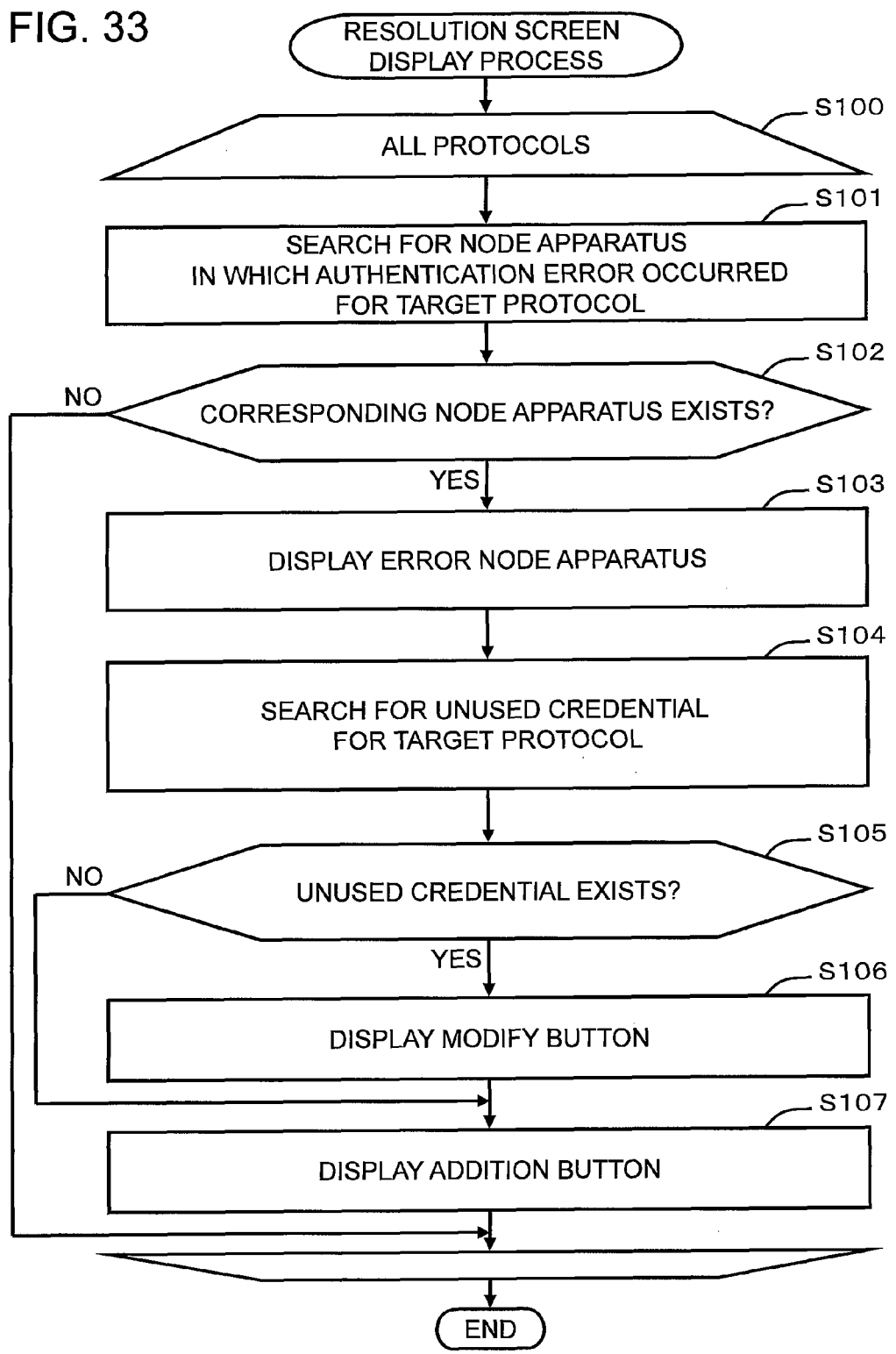
FIG. 33 is a flowchart of a display process.

FIG. 33 shows a process for displaying the resolution screen G50. The system management apparatus 10A executes S101 through S107, which will be described further below, with respect to all the communication protocols used in node monitoring (S100). The process-target communication protocol will be called the target protocol.

The system management apparatus 10A uses the plug-in application status management table 1038 to search for a node apparatus in which an authentication error has occurred with respect to the target protocol (S101). The system management apparatus 10A determines whether or not an authentication-error node apparatus exists (S102). In a case where an authentication-error node apparatus does not exist (S102: NO), this processing ends before moving to the next target protocol (S100).

In a case where an authentication-error node apparatus exists (S102:YES), the name of the authentication-error node apparatus is displayed in the error node display part G502 (S103). Next, the system management apparatus 10A searches for a credential that is not being used in any node apparatus with respect to the target protocol (S104). The system management apparatus 10A detects the unused credential by checking the credential management table 1032 (or 1032A) and the plug-in application status management table 1038.

In a case where a credential that is not being used with respect to the target protocol is discovered (S105: YES), the system management apparatus 10A displays the modify button B51 in the display part G503 (S106). In a case where a credential that is not being used with respect to the target protocol does not exist (S105: NO), 5106 is skipped.

The system management apparatus 10A displays the add button G504 in the addition part G504, ends processing, switches the target protocol to the next communication protocol, and executes Steps S101 and later.

Being configured like this, this example combines with all of the first, second and third examples to enhance user convenience. The user is able to quickly either restore or add a credential with respect to a node apparatus in which an authentication error has occurred, making it possible to rapidly resolve the authentication error.

The preferred embodiment of the present invention has been explained hereinabove, but this embodiment is an example for explaining the present invention and does not purport to limit the scope of the present invention to this embodiment. The present invention may be put into practice in a variety of other modes.

REFERENCE SIGNS LIST 1, 10, 10A System management apparatus (management system)
2, 20 Management-target apparatus (node apparatus)
30 Input/output terminal
40 Delivery apparatus
30 System management apparatus

The invention claimed is:
1. A management system comprising:
a communication interface configured to couple to multiple management-target apparatuses;
a memory configured to store a management program, multiple additional component information and multiple additional component application condition information; and
a microprocessor,
wherein each of the multiple additional component information is used for acquiring management information from the multiple management-target apparatuses; and includes:
(i) an additional program added to the management program configured to acquire management information from the management target apparatuses; or
(ii) a method or item according to a management protocol which is placed over IP (Internet Protocol);
the multiple additional component application condition information comprise a corresponding additional component information identifier and a condition for receiving information from the multiple management-target apparatuses based on the corresponding additional component information, and
by executing the management program, the microprocessor is configured to select each of the management target apparatuses and to:
(a) receive multiple first information from the selected management-target apparatus through the communication interface, and store configuration information of the multiple management-target apparatuses in the memory based on the multiple first information;
(b) determine, based on the configuration information and the multiple additional component application condition information, whether or not to use the multiple additional component information to acquire multiple second information from the selected management-target apparatus;
(c) use the multiple additional component information to receive the multiple second information from the selected management-target apparatus via the communication interface in a case where the determination in the (b) is to acquire the multiple second information; and
(d) either create or update management information of the selected management-target apparatus in the memory based on the multiple second information,
wherein the microprocessor, by executing the management program, extracts from a first additional component package, acquired from either the communication interface or an external storage medium, first additional component information that is in the multiple additional component information, and first additional component application condition information that is in the multiple additional component application condition information, and
wherein the multiple first information is acquirable prior to storing the first additional component information in the memory,
the determination in (b) is based on the first additional component application condition information, and
(c) is executed using the first additional component information.

2. A management system according to claim 1, wherein the memory stores first authentication information, and
the (c) process comprises:
(c1) sending the first authentication information to the selected management-target apparatus;
(c2) receiving a response message denoting that the first authentication information has been approved;
(c3) using the first additional component information to send a second information acquisition message to the selected management-target apparatus if the first additional component information is used for the selected management target apparatus; and
(c4) using the first additional component information to receive a second information.

3. A management system according to claim 2, wherein the multiple management-target apparatuses comprise a first management-target apparatus comprising a first component, and a second management-target apparatus comprising the first component and a second component,
the multiple first information comprise information related to the first component, and
the multiple second information comprise information related to the second component.

4. A management system according to claim 2, wherein the microprocessor, by executing the management program, extracts from a second additional component package, acquired from either the communication interface or an external storage medium, second additional component information that is in the multiple additional component information, and second additional component application condition information that is in the multiple additional component application condition information, the management program is configured to cause the microprocessor to process multiple protocols for communicating with the multiple management-target apparatuses, the memory stores second authentication information, the first authentication information corresponds to a first protocol in the multiple protocols, the second authentication information corresponds to a second protocol in the multiple protocols, and the (c) process comprises:

(c5) sending the second authentication information to the selected management-target apparatus;

(c6) receiving a response message denoting that the second authentication information has been approved;

(c7) using the second additional component information to send a second information acquisition message to the selected management-target apparatus if the second additional component information is used for the selected management-target apparatus; and (c8) using the second additional component information to receive a second information.

5. A management system according to claim 4, wherein the microprocessor, by executing the management program, in (c2), stores information for identifying the selected management-target apparatus for which the first authentication information has not been approved on the first protocol, in relation to the first additional component information, and in (c5), sends the second authentication information to the selected management-target apparatus on the second protocol without sending the first authentication information to the selected management-target apparatus if the first authentication information has not been approved on the first protocol and the second protocol is the first protocol, in relation to the second additional component information.

6. A management system according to claim 2, wherein the management system further comprises a display device, the multiple management-target apparatuses comprise a management-target apparatus to which the first authentication information has been sent, but which has indicated an authentication failure in relation to the first additional component information, and by executing the management program, the microprocessor displays on the display device as a management information acquisition error using the first additional component information:

(1) information for identifying the first additional component information;

(2) information for identifying the first authentication information; and (3) information showing that the first authentication information has not been authenticated and approved with respect to all authenticated and approved management-target apparatuses.

7. A management system according to claim 2, wherein, by executing the management program, the microprocessor also displays on the display device as a management information acquisition error using the first additional component information:

(4) a management-target apparatus showing the authentication failure for each type of protocol; and (5) information showing the possibility that the authentication setting of the management-target apparatus indicating the authentication failure is in error.

8. A management system according to claim 4, wherein the management system further comprises a display device, and in a case where third authentication information related to third additional component information is sent and an authentication failure occurs, the microprocessor, by executing the management program:

(e) sends the third authentication information subsequent to a predetermined timing, and determines whether or not all third authentication information authentications have failed; and (f) in a case where it has been determined that the result of (e) is that all authentications have failed, displays on the display device information recommending a check of the third authentication information with relation to the management information acquisition error resulting from the third additional component information.

9. A management system according to claim 2, wherein, by executing the management program, the microprocessor further displays on the display device as a management information acquisition error using the first additional component information:

(6) information showing unused authentication information, which is not being used in any management-target apparatuses, for each type of the protocol;

(7) restoration operation information for executing a process for restoring the unused authentication information; and (8) new creation operation information for executing a process for creating new authentication information.

10. A management system according to claim 4, wherein a predetermined management-target apparatus among the multiple management-target apparatuses is configured to:

either send second information to the communication interface in accordance with a predetermined process provided prior to extracting the first additional component information, or send second information to the communication interface in accordance with an additional process, which is added in conjunction with the extraction of the first additional component information.

11. A non-transitory computer readable medium storing a computer program, which when executed by one or more computers, performs a method for managing a computer system comprising multiple management-target apparatuses and a management system, wherein the management system comprises multiple additional component information and multiple additional component application condition information, each of the multiple additional component information is used for acquiring management information from the multiple management-target apparatuses, and includes:

(i) an additional program added to the management program configured to acquire management information from the management target apparatuses; or (ii) a method or item according to a management protocol which is placed over IP (Internet Protocol);

the multiple additional component application condition information comprises a corresponding additional component information identifier and a condition for receiving information from the multiple management-target apparatuses based on the corresponding additional component information, the computer system management method comprising:
in use of the management system selecting each of the management target apparatuses and,
(a) receiving multiple first information from the selected management-target apparatus and storing configuration information of the multiple management-target apparatuses based on the multiple first information;
(b) determining, based on the configuration information and the multiple additional component application condition information, whether or not to use the multiple additional component information to acquire multiple second information from the selected management-target apparatus;
(c) using the multiple additional component information to receive the multiple second information from the selected management-target apparatus in a case where the determination in the (b) is to acquire the multiple second information; and
(d) either creating or updating management information of the selected management-target based on the multiple second information,
extracting from a first additional component package, acquired from either the communication interface or an external storage medium, first additional component information that is in the multiple additional component information, and first additional component application condition information that is in the multiple additional component application condition information, and
wherein the multiple first information is acquirable prior to storing the first additional component information in the memory,
the determination in (b) is based on the first additional component application condition information, and
(c) is executed using the first additional component information.

12. A computer readable medium according to claim 11, wherein the memory stores first authentication information, and
the (c) process comprises:
(c1) sending the first authentication information to the selected management-target apparatus;
(c2) receiving a response message denoting that the first authentication information has been approved;
(c3) using the first additional component information to send a second information acquisition message to the selected management-target apparatus if the first additional component information is used for the selected management target apparatus; and
(c4) using the first additional component information to receive a second information.

13. A computer readable medium according to claim 12, wherein the multiple management-target apparatuses comprise a first management-target apparatus comprising a first component, and a second management-target apparatus comprising the first component and a second component,
the multiple first information comprise information related to the first component, and
the multiple second information comprise information related to the second component.

14. A computer readable medium according to claim 12, the method further comprising:
extracting from a second additional component package, acquired from either the communication interface or an external storage medium, second additional component information that is in the multiple additional component information, and second additional component application condition information that is in the multiple additional component application condition information;
causing the microprocessor to process multiple protocols for communicating with the multiple management-target apparatuses; and
storing second authentication information in the memory,
the first authentication information corresponds to a first protocol in the multiple protocols,
the second authentication information corresponds to a second protocol in the multiple protocols, and
the (c) process comprises:
(c5) sending the second authentication information to the selected management-target apparatus;
(c6) receiving a response message denoting that the second authentication information has been approved;
(c7) using the second additional component information to send a second information acquisition message to the selected management-target apparatus if the second additional component information is used for the selected management-target apparatus; and
(c8) using the second additional component information to receive a second information.

15. A computer readable medium according to claim 14, the method further comprising:
in (c2), storing information for identifying the selected management-target apparatus for which the first authentication information has not been approved on the first protocol, in relation to the first additional component information, and
in (c5), sending the second authentication information to the selected management-target apparatus on the second protocol without sending the first authentication information to the selected management-target apparatus if the first authentication information has not been approved on the first protocol and the second protocol is the first protocol, in relation to the second additional component information.

16. A computer readable medium according to claim 12, wherein the management system further comprises a display device,
the multiple management-target apparatuses comprise a management-target apparatus to which the first authentication information has been sent, but which has indicated an authentication failure in relation to the first additional component information,
the method further comprising causing to be displayed on the display device as a management information acquisition error using the first additional component information:
(1) information for identifying the first additional component information;
(2) information for identifying the first authentication information; and
(3) information showing that the first authentication information has not been authenticated and approved with respect to all authenticated and approved management-target apparatuses.

17. A computer readable medium according to claim 12, the method further comprising also causing to be displayed on the display device as a management information acquisition error using the first additional component information:
(4) a management-target apparatus showing the authentication failure for each type of protocol; and
(5) information showing the possibility that the authentication setting of the management-target apparatus indicating the authentication failure is in error.

18. A computer readable medium according to claim 14, wherein the management system further comprises a display device, and the method further comprising:

in a case where third authentication information related to third additional component information is sent and an authentication failure occurs:

(e) sending the third authentication information subsequent to a predetermined timing, and determining whether or not all third authentication information authentications have failed; and (f) in a case where it has been determined that the result of (e) is that all authentications have failed, causing to be displayed on the display device information recommending a check of the third authentication information with relation to the management information acquisition error resulting from the third additional component information.

19. A computer readable medium according to claim 12, the method further comprising causing to be displayed on the display device as a management information acquisition error using the first additional component information:

(6) information showing unused authentication information, which is not being used in any management-target apparatuses, for each type of the protocol;

(7) restoration operation information for executing a process for restoring the unused authentication information; and (8) new creation operation information for executing a process for creating new authentication information.

20. A computer readable medium according to claim 14, the method further comprising causing a predetermined management-target apparatus among the multiple management-target apparatuses to:

either send second information to the communication interface in accordance with a predetermined process provided prior to extracting the first additional component information, or send second information to the communication interface in accordance with an additional process, which is added in conjunction with the extraction of the first additional component information.

\* \* \* \* \*